United States Patent
Vaucher

(10) Patent No.: US 11,915,723 B2
(45) Date of Patent: Feb. 27, 2024

(54) AUTOMATED AUDIO-VIDEO CONTENT GENERATION

(71) Applicant: SoClip!, Bandol (FR)

(72) Inventor: Christope Vaucher, Bandol (FR)

(73) Assignee: SoClip!, Bandol (FR)

( * ) Notice: Subject to any disclaimer, the term of this patent is extended or adjusted under 35 U.S.C. 154(b) by 272 days.

(21) Appl. No.: 17/345,966

(22) Filed: Jun. 11, 2021

(65) Prior Publication Data

US 2021/0319808 A1    Oct. 14, 2021

Related U.S. Application Data

(63) Continuation of application No. 16/854,062, filed on Apr. 21, 2020, now Pat. No. 11,062,736.

(60) Provisional application No. 62/837,122, filed on Apr. 22, 2019.

(51) Int. Cl.
  *G11B 27/031*   (2006.01)
  *G06F 3/0482*   (2013.01)
  *G06F 3/04845*  (2022.01)

(52) U.S. Cl.
  CPC .......... *G11B 27/031* (2013.01); *G06F 3/0482* (2013.01); *G06F 3/04845* (2013.01)

(58) Field of Classification Search
  CPC .. G11B 27/031; G06F 3/0482; G06F 3/04845
  See application file for complete search history.

(56) References Cited

U.S. PATENT DOCUMENTS

| | | | | |
|---|---|---|---|---|
| 11,082,755 B2 * | 8/2021 | Kunsberg | ............... | G06F 16/739 |
| 2020/0013379 A1 * | 1/2020 | Vaucher | ............... | G11B 27/031 |
| 2020/0143839 A1 * | 5/2020 | Vaucher | ............... | G11B 27/06 |
| 2021/0248983 A1 * | 8/2021 | Balassanian | ........... | G06F 21/105 |

* cited by examiner

*Primary Examiner* — Mishawn N. Hunter
(74) *Attorney, Agent, or Firm* — Polsinelli

(57) ABSTRACT

Systems and methods for generating media content are provided. In some aspects, a process of the disclosed technology includes operations including: determining, one or more characteristics for the audio file, determining, based on a skin associated with the audio file, one or more media effects that will be applied based on the one or more characteristics of the audio file, applying the one or more media effects to a media file to generate a modified media file; and generating an audio-video file comprising a combination of the audio file and the modified media file. Systems and machine-readable media are also provided.

20 Claims, 22 Drawing Sheets

```
{"header"+"5oclip........................................& Jay
Hardway"........................................
[1,41.........................................
[1,41,........................................"cutsSlow"......................"contentSyncings":
[0,57.........................................
23,455,...........Section 1.........."cutsSlow":.............2202........."cuts"..................,013
(0,57............................................                                    ⌢  Cuts positions
23,455,........................................                                               ,013
(0,57............................................"cutsfast":
23,455,.........................................
(0,57,...................................2204...."fxs_0"—Fx positions             ,013
23,444,........................................
[0,497,........................................                                      ,975,
1,72..........................................                                      ,22.55
...................................................."contentSyncings":
[0,497,.........................................                                     12,715,
13,...........Section 2..............."endfxlevel":...........................23,440,
.23..........................................."cutsfast":..................."cutsSlow":
0,77..........................................
[0,243,........................................"fxs_3":
[0,243,........................................
5,293,........................................"contentSyncings":.....................           "type",3]"
4,043............................................                                        "fxs_0"
{"beginTime"...2206
1,005..........Section 3............"contentSyncings":.........2208..."endTime":
108,..........Section 4..............."cutsSlow":
[0,078,........................................"cutsfast":
[0,078,........................................"fxs_0":
[0,244,.........................................................................."contentSyncings":
[0,055,............................................................................"silenceFadeInDuration":
0,"silenceFadeInDuration":..............................................................."videoBeatSync":
0,"beginFXLevel":............................................................................."cutsfast":
[0,249,.................................................................................."contentSyncings":
[0,165,.......................................................................................   "beginTime":
119,........................................................................................."endEnergy":
0.318...................................................................................."cuts":
```

FIG. 22

AUTOMATED AUDIO-VIDEO CONTENT GENERATION

CROSS-REFERENCES TO RELATED APPLICATIONS

This application claims the benefit of U.S. application Ser. No. 16/854,062, entitled "AUTOMATED AUDIO-VIDEO CONTENT GENERATION," filed on Apr. 21, 2020, which claims the benefit of U.S. Provisional Application No. 62/837,122, filed on Apr. 22, 2019, all of which are entirely incorporated by reference herein.

FIELD

The present invention generally relates to a platform for video editing and in particular, to an adaptive computer model for generating media content using music-based video editing.

BACKGROUND

Conventional audio-video content editing requires specialized software to perform. Furthermore, how to edit audio-video content requires experience and expertise in order to understand how to properly perform edits to the video portion of the content based on the accompanying audio portion of the content. With how popular audio-video content is, for example, in sharing content with others, there is a need to provide a way to allow the general public the capabilities of being able to edit audio-video content.

SUMMARY

Systems and methods for automatically editing/generating audio-video content are disclosed, where the audio portion of the audio-video content can be processed to identify various elements that can be used for applying media effects. An audio file (e.g., a song, music, etc.), a media file (e.g., pictures, video, images, etc.) which excludes the audio file, and a template/strategy (referred to as a skin) for applying media effects can be used for automatically generating audio-video content, such as music video clips. The audio file may be processed to determine parameters or elements such as sections of average energy levels, transitions, beats (beats-per-minute, main beat, drum hit types, etc.), audio events level (ex: Drum Hit Intensity), audio volume envelop (called SoundFlow), and the skin may automatically apply media effects to the media file based on these parameters of the audio file to generate the audio-video file. For example, long transitions may be more applied for calm and slow music (corresponding to low energy sections) whereas shorter transitions may be more applied for fast and powerful music (corresponding to high energy or beats-per-minute sections).

In some examples, a method of generating media content is described. The method comprises processing an audio file to determine one or more parameters of the audio file; determining, based on a skin associated with the audio file, one or more media effects corresponding to the one or more parameters of the audio file; applying the one or more media effects to a media file to generate a modified media file, wherein the media file excludes the audio file; and generating an audio-video file comprising a combination of the audio file and the modified media file.

In some examples, a system is described. The system, comprises one or more processors; and a non-transitory computer-readable storage medium containing instructions which, when executed on the one or more processors, cause the one or more processors to perform operations for generating media content, the operations including: processing an audio file to determine one or more parameters of the audio file; determining, based on a skin associated with the audio file, one or more media effects corresponding to the one or more parameters of the audio file; applying the one or more media effects to a media file to generate a modified media file, wherein the media file excludes the audio file; and generating an audio-video file comprising a combination of the audio file and the modified media file.

In some examples, a non-transitory computer-readable medium is described, the non-transitory computer-readable medium is described having stored thereon instructions that, when executed by one or more processors, cause the one or more processors to: process an audio file to determine one or more parameters of the audio file; determine, based on a skin associated with the audio file, one or more media effects corresponding to the one or more parameters of the audio file; apply the one or more media effects to a media file to generate a modified media file, wherein the media file excludes the audio file; and generate an audio-video file comprising a combination of the audio file and the modified media file.

Some examples further comprise obtaining the media file from one or more images, photographs, or videos, based on receiving a first user input from a first user interface. In some examples, the first user interface comprises a first spinner (or other suitable display/selection interface) for displaying visual representations of the one or more images, photographs, or videos and receiving a selection of the one or more images, photographs, or videos corresponding to the first user input.

Some examples further comprise obtaining the audio file from one or more music, song, or other audio data, based on receiving a second user input from a second user interface. In some examples, the second user interface comprises a second spinner (or other suitable display/selection interface) for displaying visual representations of the one or more music, song, or other audio data and receiving a selection of the one or more music, song, or other audio data corresponding to the second user input.

Some examples further comprise obtaining the skin from one or more skins comprising media effects, based on receiving a third user input from a third user interface. In some examples, the third user interface comprises a third spinner (or other suitable display/selection interface) for displaying visual representations of the one or more skins and receiving a selection of the one or more skins corresponding to the third user input.

In some examples, processing the audio file to determine the one or more parameters comprises: determining one or more sections of the audio file, wherein each of the one or more sections comprises substantially uniform energy levels, with transitions in energy levels between adjacent sections corresponding to beats; determining, one or more characteristics for each of the one or more sections, the one or more of characteristics comprising one or more of: occurrence of drum hits, types of drum hits, or distance between drum hits sequences; and determining a section type unique number (STUN) for each of the one or more sections based on the one or more characteristics for each of the one or more sections, wherein the one or more parameters of the audio file are based on the STUN for each of the one or more sections of the audio file.

In some examples, the one or more media effects comprise one or more of: edits comprising changing aspects of the media file to incorporate one or more of zoom, color translations, or brightness adjustments; transitions comprising one or more crossfade, or dissolve effects; or adjusting one or more levels of intensity, speed, or duration associated with displaying the media content.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 22 illustrates a play instruction file, in accordance with some examples.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology address limitations of current conventional audio-video content editing, by providing a platform with an underlying process that automatically creates media content which can include edits, effects, etc., applied to a video portion of the audio-video content based on the audio portion of the audio-video content. The automated processes for media content generation can be performed in a manner that is consistent with, for example, edits made to a video by those that have experience or expertise in the field of audio-video content editing. However, instead of requiring a user to manually make the edits or generating content (e.g. by selecting a particular portion of the audio-video content and then selecting a particular edit to be performed or effect to be implemented), the disclosed technology analyzes the underlying audio portion of the audio-video content in order to identify the types of edits/content generation to be automatically implemented to the video portion of the audio-video content and when those edits/generated content are to be incorporated in an audio-video file.

As used herein, audio-video content refers to any type of media or video content that has an associated audio portion that is played alongside the video portion during the duration of the audio-video content. Example audio-video content may be a music video where the audio portion of the audio-video content is music. The underlying audio portion of the audio-video content is a necessary portion of the audio-video content editing described within the present disclosure as the processes will utilize parameters associated with the audio portion to identify what type of edits should be performed to the video portion of the audio-video content and where those edits should be incorporated.

Figure 1:
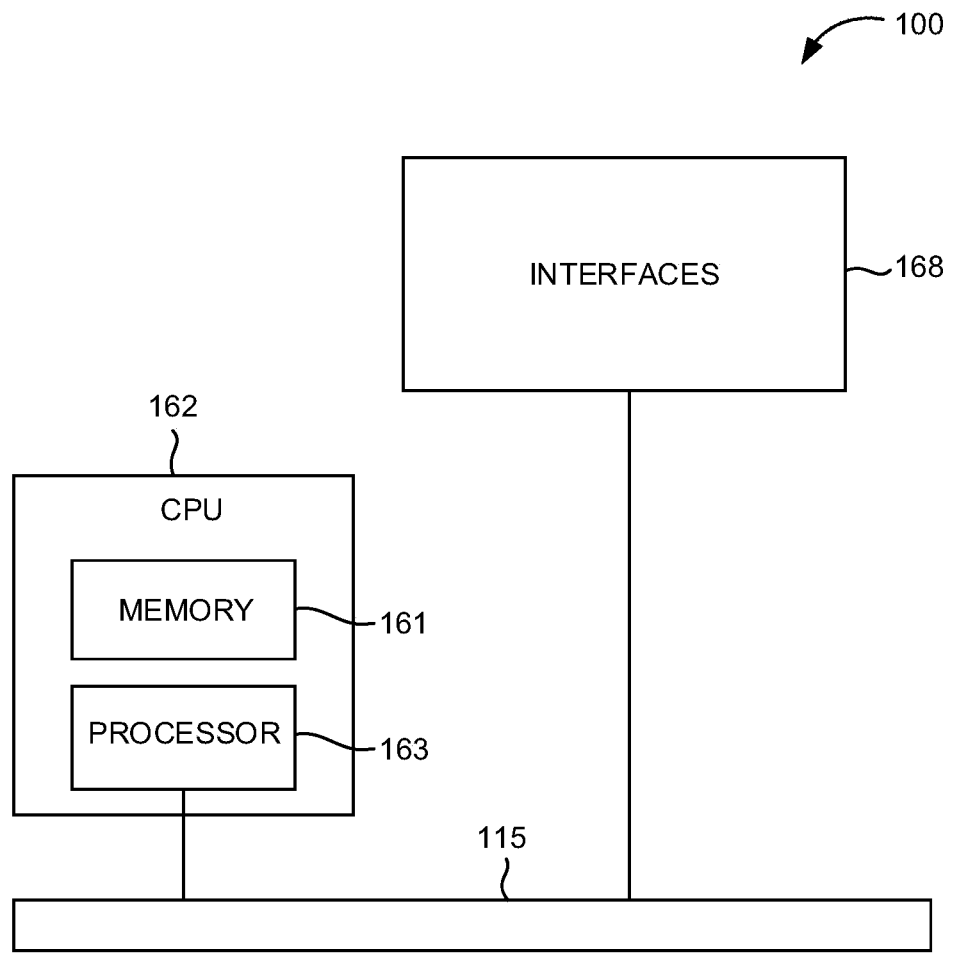
FIG. 1 illustrates a processor-based device for implementing aspects of the technology described herein, in accordance with some examples.

FIG. 1 illustrates an example processor-based device 100 that can be used to implement various aspects of the technology. For example, processor-based device 100 may be used to implement the audio-video content editing described in the present disclosure. It is further understood that the processor-based device 100 may be used in conjunction with one or more other processor-based devices, for example, as part of a computer network or computing cluster. Processor-based device 100 includes a master central processing unit (CPU) 162, interfaces 168, and a bus 115 (e.g., a PCI bus). CPU 162 preferably accomplishes all these functions under the control of software including an operating system and any appropriate applications software. CPU 162 can include one or more processors 163 such as a processor from the Motorola family of microprocessors or the MIPS family of microprocessors. In an alternative embodiment, processor 163 is specially designed hardware for controlling the operations of processor-based device 100. In a specific embodiment, a memory 161 (such as nonvolatile RAM and/or ROM) also forms part of CPU 162. However, there are many different ways in which memory could be coupled to the system.

Interfaces 168 can be provided as interface cards (sometimes referred to as "line cards"). Generally, they control the sending and receiving of data packets over the network and sometimes support other peripherals used with the router. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Figure 2:
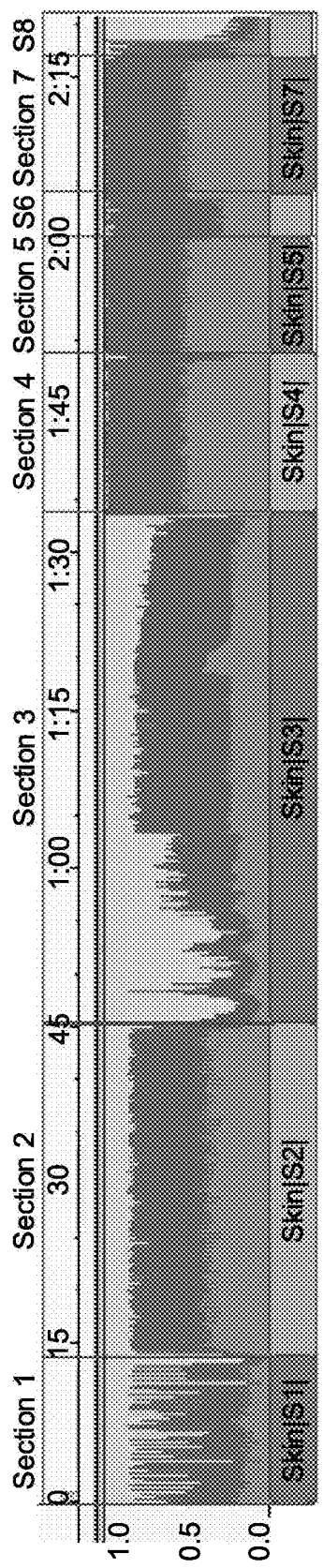
FIG. 2 illustrates aspects of audio-video content editing, in accordance with some examples.

FIG. 2 illustrates an example step for performing audio-video content editing. Specifically, the figure shows that an audio portion (e.g. music or song) of the audio-video content can be broken down into a number of different sections (e.g. section 1, section 2 . . . section 8). The number of sections and where those sections are found during the audio portion is based on the duration of the audio content as well as the audio content itself.

Based on the identified sections within the audio portion of the audio-video content, skins can determine how the different activated properties/effects and transitions to the video portion of the audio-video content will be implemented. As used herein, skins are defined as a list of activated properties/effects (e.g. FX) and transitions that will be applied to the video portion of the audio-video content. The skins facilitate performance of the automated video editing feature that will allow the general public to take advantage of the present invention to perform audio-video editing or media content generation using the skins, that before would require specialized software and experience to properly perform. How those automated video editing features/effects are actually implemented into the video portion will depend on the accompanying audio-portion being played with the media content on display.

There may be any number of different types of activated properties and transitions that can be implemented into the video portion of the audio-video content. For example, some activated properties may include changing aspects of the video to incorporate zoom, color translations, and different brightness. Some example transitions may include incorporating crossfade or dissolve effects. Furthermore, there may be parameters associated with the activated properties and/or transitions that define the levels (i.e. intensity) and duration of each different activated properties and/or transition used. It should be noted that many other types of activated properties and transitions can also be used in addition to the ones described above. In particular, those activated properties and/or transitions that are known and used in audio-video editing can also be implemented in the present disclosure.

Further details pertaining to how to breakdown an audio portion of the audio-video content into different sections and how to apply the skins to the media content in accordance with the different sections of the audio will be provided below. In addition, provisional applications Nos. 62/693,799 and 62/755,172 which provide details relating to technology pertaining to how beat tracking and beat matching are performed, respectively, are incorporated herein by reference. The beat tracking and beat matching technology will facilitate in the breakdown of the audio portion of the audio-video content into the different sections as well as assist in characterizing the parameters associated with the audio in order to create the play instruction files used to identify where the edits should be performed within those sections (e.g. where the cuts should be located, where the activated properties/effects should be located).

Figure 3:
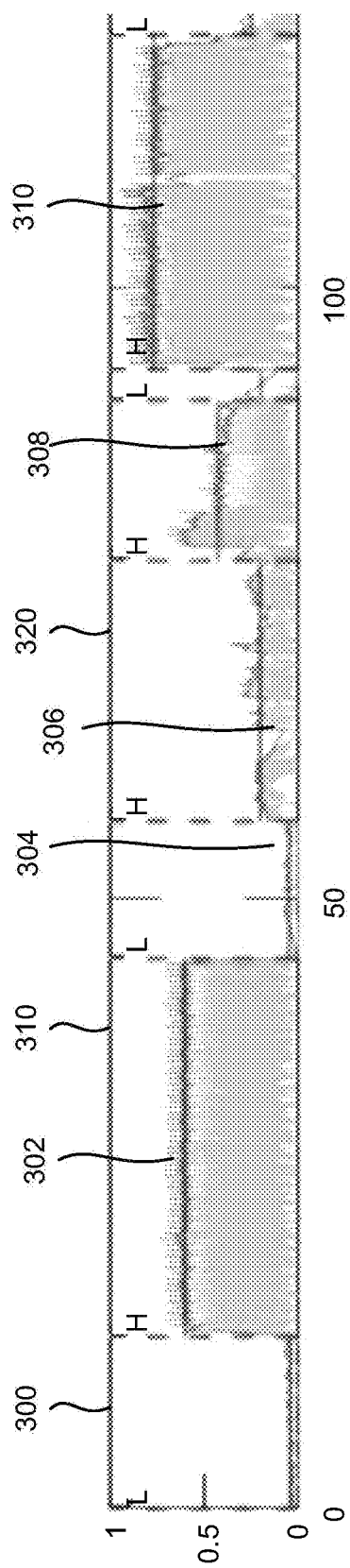
FIG. 3 illustrates energy levels associated with an audio portion of audio-video content, in accordance with some examples.

FIG. 3 illustrates example average energy levels associated with an audio portion of audio-video content. In order to break down the audio portion into different sections, a first step is to identify portions of the audio content that have similar average energy levels. The figure illustrates a first step that involves identifying the various average energy levels associated with the audio portion of the audio-video content. This will be referred to as a "Level 1 section break down." The average energy levels are identified as the horizontal lines shown in FIG. 3, with some of the average energy levels representatively designated by reference numerals 302, 304, 306, 308, 310.

The audio portion is first converted from its original audio file form (e.g. .MP3, .M4A) into a .wav file. After the initial conversion is performed, low-pass filter is used on the .wav file. Afterwards, a "double envelope" process is performed on the .wav file. This is a first exemplary way to process the audio portion (e.g. song) so that the average energy levels of the audio portion can be characterized. There may be other ways known in the art that could also be used as well.

The result of the conversion and the two subsequent steps provides the illustration of FIG. 3 which shows the average energy levels associated with the audio portion of the audio-video content having values between 0 and 1. The closer the average energy level is to 0, the more likely that portion of the audio has calm elements. In contrast, the closer the average energy level is to 1, the more likely that portion of the audio has powerful or loud elements.

Generally, sections of the audio portion can be initially identified based on detected energy drops between adjacent portions of the audio. For example, points 300, 310, and 320 correspond to some portions of the audio that have large drops between different parts of the audio. The range in which a drop in the average energy levels can potentially flag a different section may initially be set or pre-determined. However, the range can be tuned over time, for example, via artificial intelligence-related processing which modifies the range based on performing similar processing on different audio over a period of time.

Figure 4:
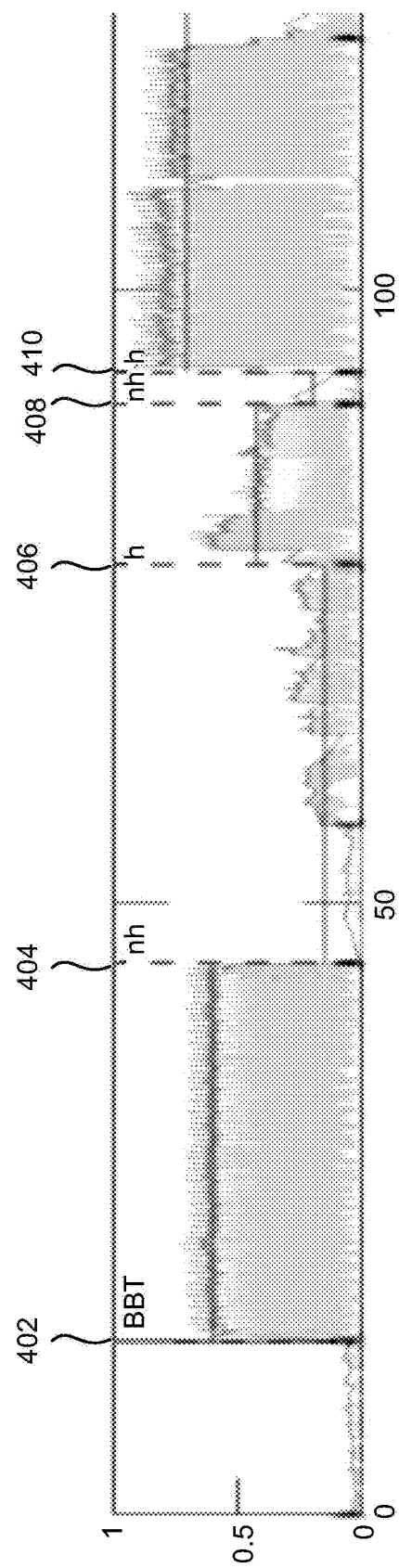
FIG. 4 illustrates hit count levels associated with an audio portion of audio-visual content, in accordance with some examples.

FIG. 4 illustrates example section types associated with the audio portion of the audio-visual content. In particular, after the "level 1 section breakdown" has been completed which provides an average energy level as illustrated in FIG. 3, a "level 2 section breakdown" is performed next. In this next step, the level 1 sections obtained during the "level 1 section breakdown" are processed in order to track drum hits. Exemplary drum hits that can be tracked in the level 2 section breakdown can include kicks, snares, Charleys, toms, or others. "Hit" sections are created where drum hits are contiguous by less than X seconds, X typically equal to 2.5 seconds. Such sections (referred as 'h' on FIG. 4) are delimited by 2 bounds as for example (402; 404), (406; 408), etc. The complement of HIT sections are called NOHIT sections. Such sections (referred as 'nh' in FIG. 4) are delimited by 2 bounds as for example (404; 406), (408; 410), etc.

Based on the type of drum hits that were detected within a section, different tags can be assigned to that section. For example, any section without any drum hits can be tagged with a "0." Sections that have one or more of kicks, snares, and Charleys would be tagged with "1s" as applicable. For example, a section with all three may be tagged with "1110" while a different section with only snares and Charleys may be tagged with "0110."

The tag can be as long as necessary to identify the different types of drum hits that can be detected for that section. For example, if the "level 2 section breakdown" is looking for four different type of drum hits (e.g. kick, snare, Charleys, and toms), the tag can be provided a length of 4 as described above in the example. Details regarding how the drum hits are specifically detected and tracked are further described in provisional application No. 62/693,799 which has been incorporated herein by reference. The resulting output from the drum hits tracking provides the illustration in FIG. 4.

Figure 5:
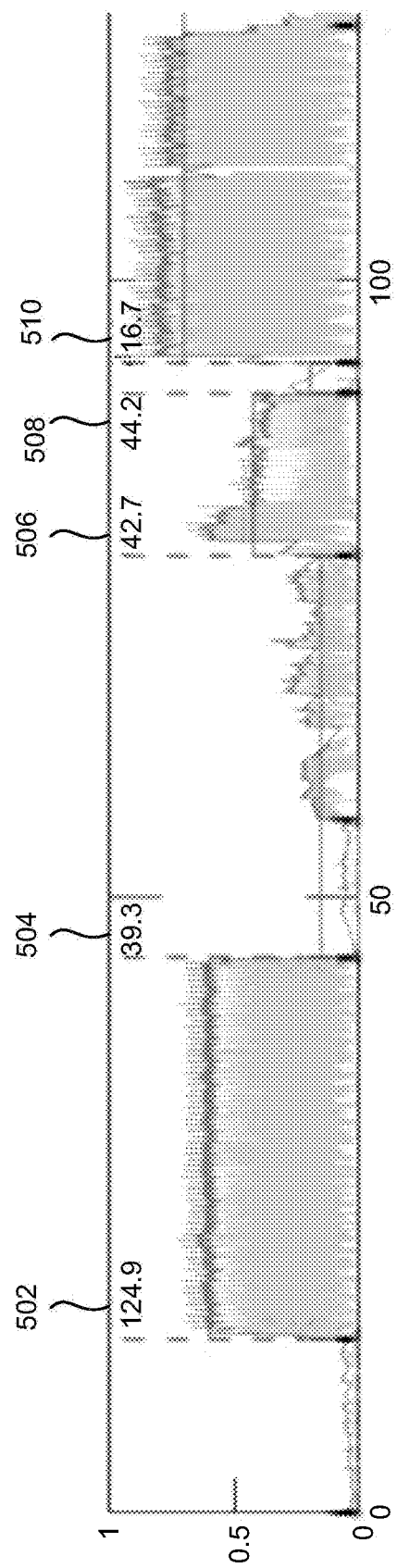
FIG. 5 illustrates beats-per-minute levels associated with an audio portion of audio-visual content, in accordance with some examples.

FIG. 5 illustrates example measurements of the beats-per-minute levels associated with the audio portion of the audio-visual content. For example, beats-per-minute levels 502, 504, 506, 508, and 510 are illustrated for corresponding sections in FIG. 5. In particular, after the "level 2 section breakdown" has been completed, as illustrated in FIG. 4, a "level 3 section breakdown" can be performed. The "level 3 section breakdown" processes the output of the "level 2 sections" in order to track the Main Beat. In particular, each of the sections may be tagged with values associated with the "level 3 section breakdown" corresponding to the beats-per-minute of that section. Details regarding how the Main Beat is tracked are further described in provisional application No. 62/755,172 which has been incorporated herein by reference. The resulting output from the Main Beat tracking provides the illustration in FIG. 5.

Figure 6:
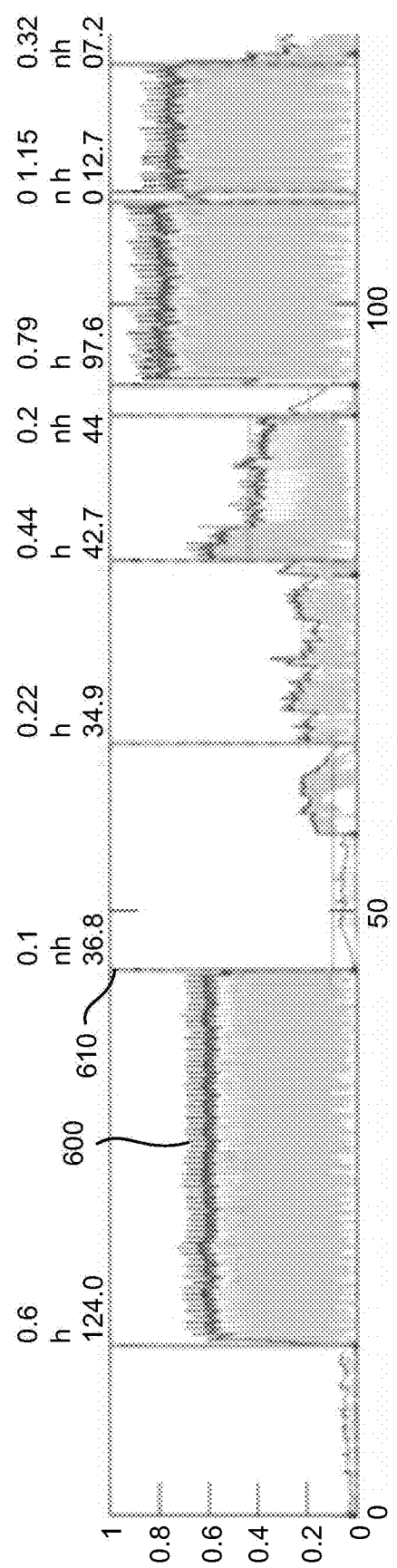
FIG. 6 illustrates a combination of energy levels, hit count levels, and beats-per-minute levels associated with an audio portion of audio-visual content, in accordance with some examples.

FIG. 6 illustrates the combination of the level 1, level 2, and level 3 section breakdowns. By using the three breakdowns, the different sections of the audio portion of the audio-visual content can be shown. In particular, a final section (which corresponds to an actual section within the audio portion identified by the present beat tracking and beat matching technology) is a continuous excerpt of the audio portion where values, tags, and descriptors associated with the level 1, level 2, and level 3 section breakdown are similar (such as point 600). Significant changes between a point in time in relation to the values, tags, and descriptors associated with the level 1, level 2, and level 3 breakdowns (for example, with point 610) are indicative of the end of a current section and the start of a new section.

Although the figure, and the embodiments described in the present disclosure, present the use of the level 1, level 2, and level 3 section breakdowns in this one particular manner, it should be known that other and different processes may also be possible for the purposes of characterizing parameters of the song. For example, an embodiment may use three different level 1 section breakdowns. Furthermore, there may be alternative methods that can also be implemented in addition to the level 1, level 2, and level 3 section breakdowns that would facilitate characterizing the parameters of the song. Furthermore, there may be more than 3 levels or less than 3 levels.

Up to this point of the disclosure, the beat tracking and beat matching technology described above in order to identify different sections within the audio portion of the audio-video content has been previously covered in two different provisional applications, which are both incorporated by reference herein. The following description of the present disclosure expands on the beat tracking and beat matching technology by utilizing these technologies in order to identify and implement the skins as video edits to the media content in accordance with the corresponding sections of the audio so that corresponding portions of video/media content played during the section of the audio can be edited, created, or generated automatically.

There are particular processes that are followed by editors or content generators that may include matching specific edits with specific elements that are present in the audio portion of the audio-video content. Edits, effects, transitions, etc., made to the video portion of the audio-video content that are made in an appropriate fashion associated with the audio portion can be more appealing to viewers compared to effects added to the video that are not consistent with the audio portion. Prior to the present application, the editors/content generators utilize experience and feedback to determine what video effects are appropriate and when those effects are to be implemented in the video portion. However, in the present disclosure, processes are now described where information about the audio portion can be used in order to automate the process of identifying the appropriate video effects (e.g., edits, transitions, activated properties, etc.) and identifying when and how those video effects should be implemented in the video portion.

Figure 7:
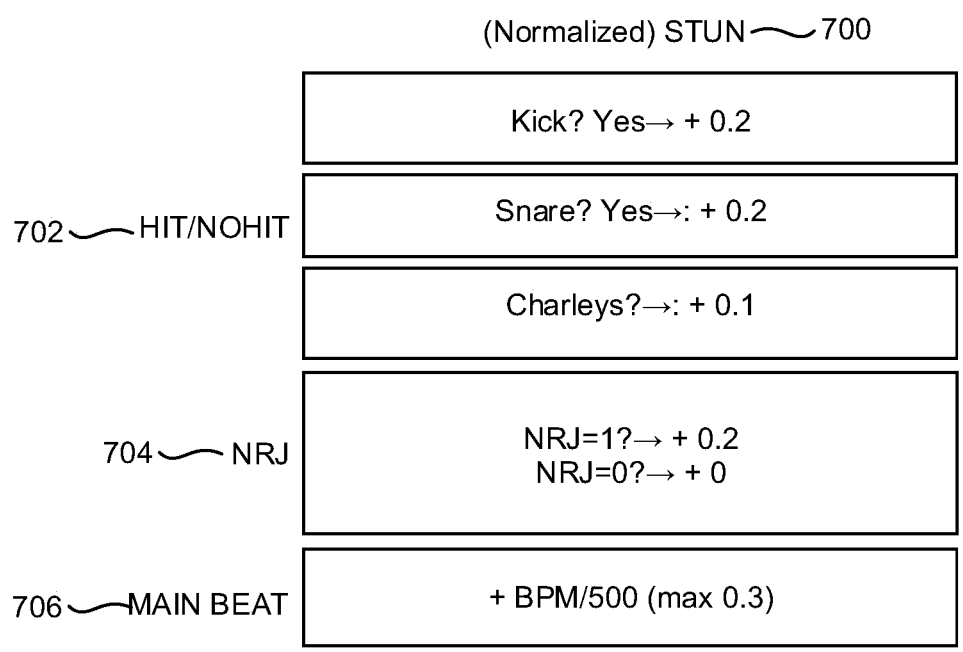
FIG. 7 illustrates a table for calculating a section type unique number (STUN) for sections of an audio portion of audio-visual content, in accordance with some examples.

FIG. 7 illustrates an example table used to calculate the section type unique number (STUN) 700. Each section of the audio portion can have a corresponding STUN value 700 calculated based on information obtained from the previous level 1, level 2, and level 3 section breakdown processes described above. The STUN value 700 can be a value between 0-1 in some implementations, where the STUN value 700 can be used to modify various parameters associated with the skin defining how the activated properties/effects, and transitions are applied as edits within the media (e.g., video, photos). That STUN value 700, as illustrated in the figure, is calculated by aggregating different values obtained from performing, the level 1, level 2, and level 3 section breakdowns.

For example, as illustrated in the figure, by looking at the level 1 section breakdown, if the energy level (MU) 704 is 1, then the STUN value 700 for that section is provided a +0.2 value. If the energy level is 0, then the STUN value for that section is not modified. Looking at the level 2 section breakdown, the presence (i.e., HIT/NO-HIT indication 702) of any kicks, snares, and/or Charleys can be used to modify the corresponding STUN value 700 (e.g. an increase of 0.2 if a kick is present, an increase of 0.2 if a snare is present, and/or an increase of 0.1 if a Charley is present). By looking at the level 3 section breakdown, the STUN value 700 can be modified based on the measured beats-per-minute or main beat 706 (to a max of 0.3).

The resulting STUN value 700 calculated by looking at the level 1, level 2, and level 3 section break downs can be used to characterize the type of audio within that section. STUN values closer to 0 may indicate that the audio portion corresponds to audio that is calm, similar to, for example, Healing or New Age music. STUN values closer to 1 may indicate that the audio portion corresponds to audio that has powerful elements, similar to, for example, Heavy Metal music.

As described above, STUN values can be used to set editing parameters regarding how activated properties/effects and transitions can be applied to the corresponding sections. For example, long transitions may be more appropriate for calm and slow music whereas shorter transitions may be more appropriate for fast and powerful music. While any skin can be used on any section, the STUN value 700 could also be used to select preferable skins for the current section. Indeed, it would be generally understood that certain activated properties/effects (e.g. FX) and transitions could be more appropriate for one type of music than another.

The preferable skin selection described above, however will not prevent users from selecting any skin and applying that skin to one or more sections. If desired, users can select a preferred skin to apply to the audio-video content. The user selected skin will be applied accordingly.

Figure 8:
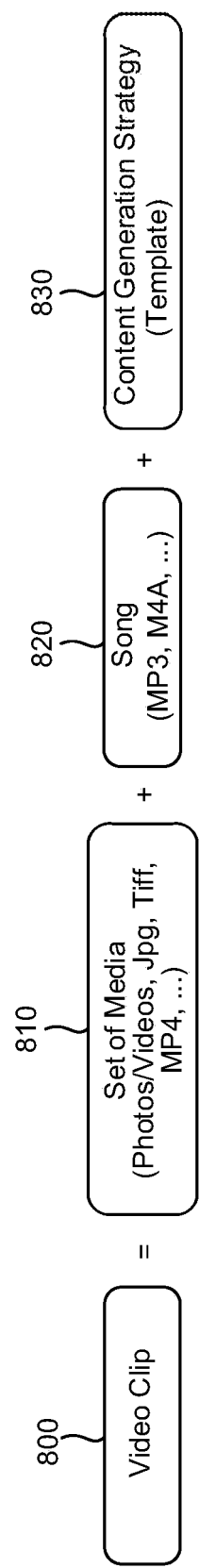
FIG. 8 illustrates an overview of the parts associated with audio-video content, in accordance with some examples.

FIG. 8 illustrates an overview of the parts associated with audio-video content applicable with the present technology described herein. The audio-video content, also referred to as a music video or video clip 800, can be broken into three parts. A first part 810 corresponds to the non-audio portion (or media/video portion) of the audio-video content. Although the present disclosure has referenced the non-audio portion of the audio-video content as a video portion, it should be known that the present technology can be used in connection with media content that are not videos as well. For example, a one or more photos (e.g. jpg file) can be chosen that will later be shown in association with music can also be edited with the present technology. The present technology could then edit the one or more photos based on the underlying audio portion (e.g. music).

A second part 820 corresponds to the audio portion (e.g. music) of the audio-video content. This may generally correspond to music. It may be possible, however, to include a collection of sounds with the non-audio portion 810 such that the collection of sounds (as the audio portion 820) would be used to edit the non-audio portion 810. This will generally correspond to the music that users would like to combine with the set of media associated with the first part 810 that the user selected to be edited.

The third part 830 corresponds to the content generation strategy. Described in further detail below, the content generation strategy 830 corresponds to one or more templates that can be used to perform edits or implement effects in the non-audio portion 810 (e.g. video, photos) based on the corresponding audio portion 820 that will be combined with the first part 810 and would be playing at that same time the media content is displayed. The content generation strategy 830 can dictate implementation of various activated properties/effects (e.g. FX) and transitions as defined by the applicable template associated with the skin that can be user selected.

The non-audio portion of the audio-video content (e.g. video, images/photos) associated with a section of the audio portion can also include three different types of arrangements: main media, text boxes, and overlay boxes. The main media can refer to the actual photos or videos that are selected by the user associated with the audio. The text boxes refer to any text that appear over the photo or video. The overlay boxes refer to additional non-audio related elements (e.g. additional pictures or videos) that are embedded in the main media.

The content generation strategy associated with the skin can implement activated properties/effects and transitions to each of these three types of arrangements accordingly so that not only can the main media be edited based on the audio portion of the audio-video content but also the text and the embedded content (e.g. picture-in-picture) as well. The types of edits that can be performed/effects that can be introduced may be similar to the edits performed/effects introduced on the main content. In some cases, the edits/ effects may also be more limited in nature or completely different from the type of edits/effects added to the main content.

Figure 9:
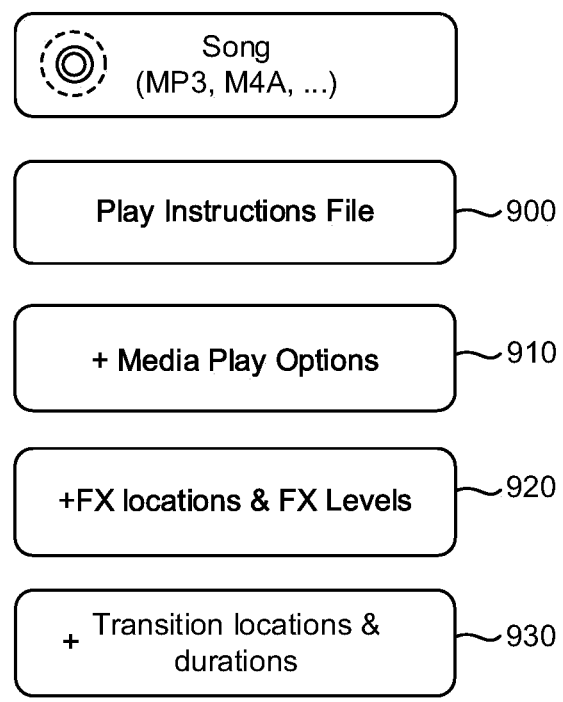
FIG. 9 illustrates aspects of processing an audio portion of the audio-video content, in accordance with some examples.

FIG. 9 illustrates an example methodology associated with processing the audio portion of the audio-video content. In particular, the audio portion of the audio-video content can be processed to identify various elements that can be used to build an editing strategy for the associated video portion of the audio-video content. The strategy, as defined by the skin, can set editing options and parameters according to the audio portion's structure and events (e.g. drum hits, main beat).

From the audio portion (e.g. song) of the audio-video content, a first set of generated data would correspond to the play instruction file 900. The play instruction file 900 (also called "sync file") can include the information used to create the edited audio-video content. For example, the play instruction file 900 can include the instructions to automate the editing/effect generation of the video portion in a manner similar to how a professional video editor would have edited it if performed by an individual. Such instructions can include the cuts and FX optimal positions and transitions positions. An exemplary play instruction file can be seen, for example, in FIG. 22.

The media play options 910 can include instructions that instruct how the non-audio portion (e.g. video or pictures) will be displayed. For example, parameters such as detailing the speed at which the non-audio portion (such as videos) is played can be defined here.

The FX location & FX level 920 can define where the activated properties/effects will be applied. These activated properties/effects are those that have been identified and stored in the play instruction file 900. Furthermore, the FX location & FX level 920 can also define at what level (e.g. duration, intensity) the effects are applied.

The transitions location & duration 930 can define where the transitions are located within the video portion of the audio-video content. The transitions that are used have been identified in the play instruction file 900. Furthermore, the transitions location & duration 930 can also define how long the transitions may last. The transition would correspond, for example, the change from one media to the next one and having the video portion edited in a manner during the change between 2 subsequent media (photos or videos).

Figure 10:
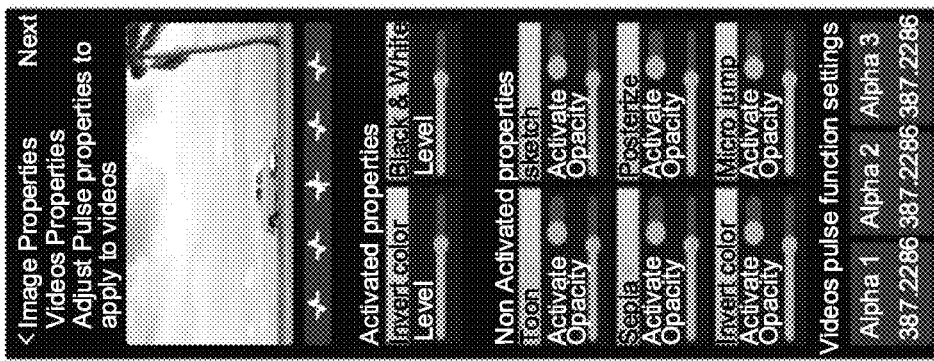
FIG. 10 illustrates a user interface for customizing skins, in accordance with some examples.
Figure 10:
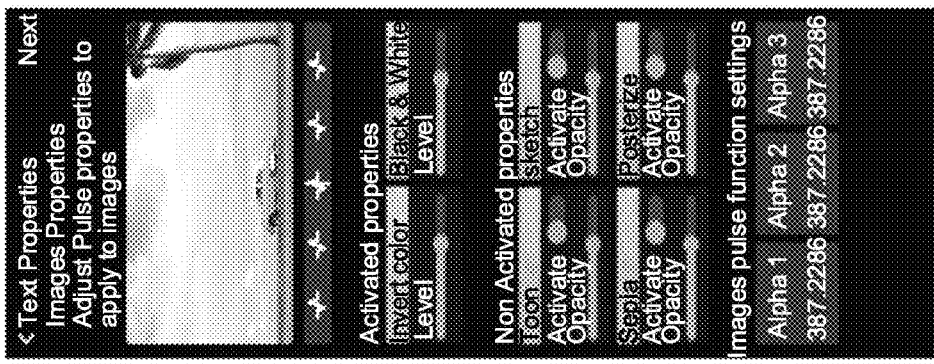
Figure 10:
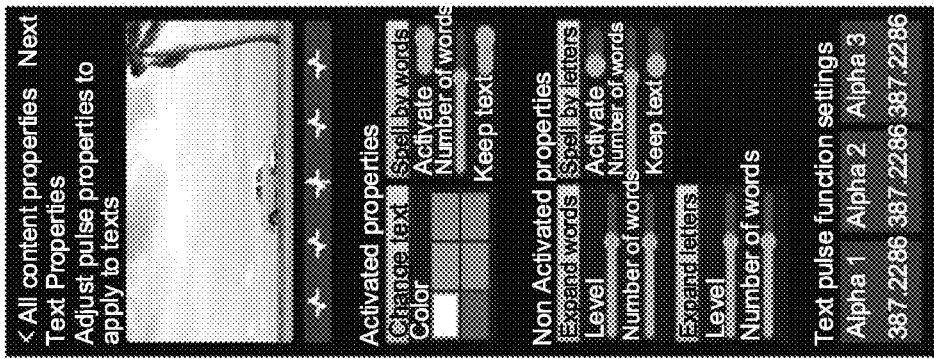
Figure 10:
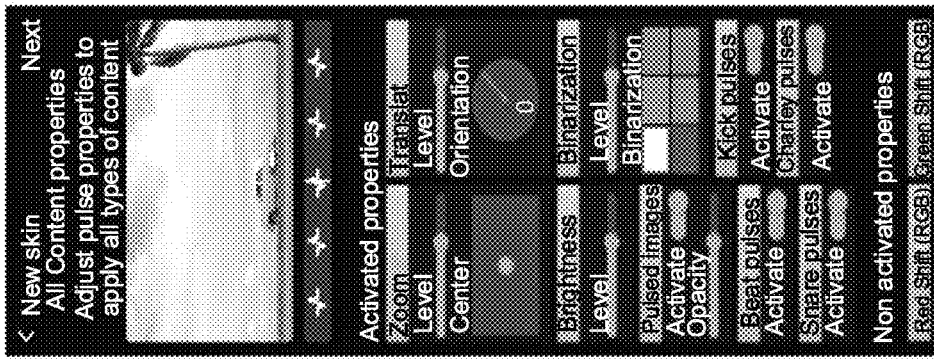

FIG. 10 illustrates example user interface for customizing skins. Although there may be skins that would available to everyone to use by default to edit media content (e.g. video, photos), the figure illustrates an interface that allows anyone to be able to create their own customized skins in order to edit their own audio-video content using their personal preference. Furthermore, users would be allowed to save and share their customized created skins with others.

As described above, skins correspond to a list of activated properties/effects (e.g. FX) and transitions that can be applied 1) to the video portion of the audio-video content and 2) to text boxes and overlay boxes. The figure illustrates different menus that list various different properties that can be implemented as edits or effects to the video portion of the audio-video content within the customized skin. Users can activate (and disable) different properties, define when certain properties are activated (based on a particular element within the underlying audio portion such as detecting a kick or during a transition), as well as the extent/intensity or duration of the activated property. The extent/intensity or duration can be adjusted, for example, via a scroll bar which represents short/low intensity if the indicator is on the far left with the max intensity or longest duration if the indicator is on the far right.

The various menus illustrated in FIG. 10 show example parameters that can be implemented. For example, under the first menu 1000, a skin can be provided custom definitions on when or how to implement features such as zoom features, translations, brightness, and color shifts. In the second menu 1010, text color, text formation, and text sizing can be adjusted. In the third menu 1020, the non-audio portion (e.g. photos/images) can be inverted or color changed. The fourth menu 1030, the non-audio portion (e.g. videos) can similarly be inverted or color changed. As noted above, any number of different types of activated properties/ effects (e.g. FX) and transitions can be used with the present technology. Furthermore, these user interfaces may be updated to add additional or newer properties as well as be re-arranged to place newer or more popular properties higher up compared to older and less popular properties.

The set of properties that users select associated with their skin can then be named and saved. The template may be stored in an application, on the user device that is performing the audio-video editing, or uploaded to a cloud server. Once saved, the skin may be shared between different devices or be accessible from the cloud server and downloaded by other users onto their respective devices for use.

In an embodiment, the ability to create customized skins can be restricted to specific users (e.g. recognized skin creators, subscribers who pay a fee to be allowed access to this feature). The skins created by these specific users can be shared with other users, for example, via the skin store (described in FIG. 20).

Figure 11:
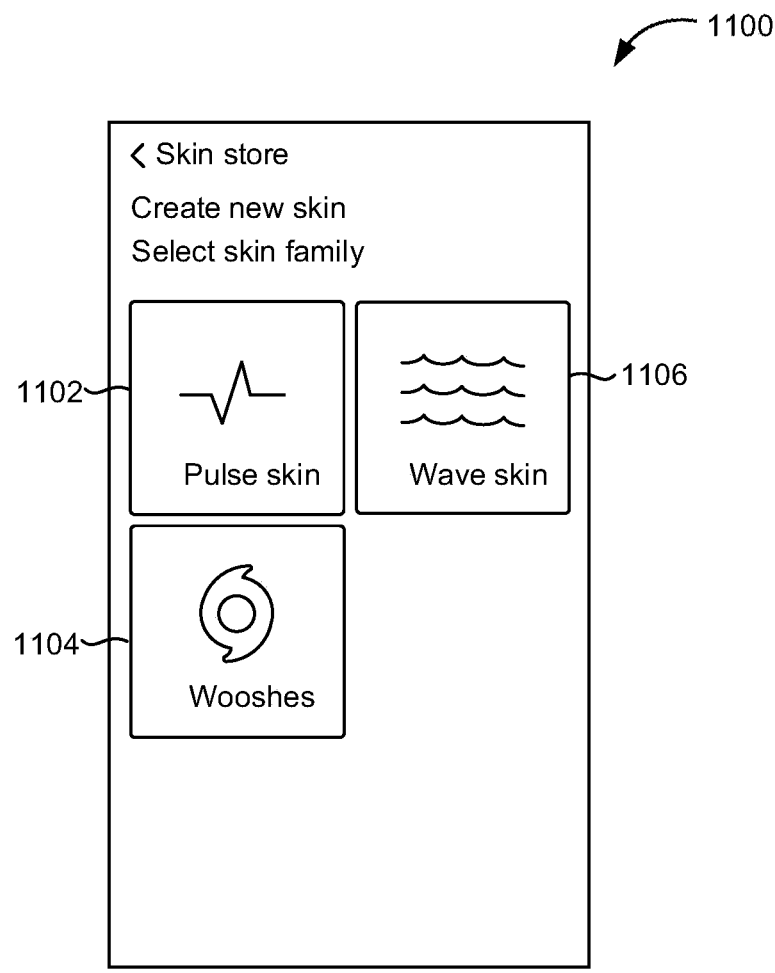
FIG. 11 illustrates a user interface associated with customizing skins, in accordance with some examples.

FIG. 11 illustrates another exemplary user interface for a skin store 1100 associated with customizing skins. In particular, the figure shows that a user can select between three different types of sub-skins (e.g., are pulse 1102, whoosh 1104, and wave 1106) that can be used to generate the skin that will be applied to the video portion of the audio-video content. There may be more different types of sub-skins available in other embodiments compared to what is initially shown in the figure. The other sub-skins would have other characteristics that could be applied with respect to the video portion of the audio-video content as known in the art.

As illustrated in the figure, the exemplary three sub-skin types, pulse 1102, whoosh 1104, and wave 1106 may be made available via the skin store 700. Pulse skins 1102 may be a type of skin where the activated properties/effects have duration that are typically short (e.g. 200 ms). The pulse skin 1102 may be applied to drum-like audio elements found in the audio portion of the audio-video content. Whoosh skins 1104 may be a combination of a pulse skin 1102 and an additional short sound. The whoosh skins 1104 may similarly be applied to drum-like audio elements. Wave skins 1106 pertain to activated properties/effects that have a duration that last typically over a few seconds. Since the wave skins 1106 have longer durations, these are typically applied during play of the media (e.g. video) associated with audio portion sections.

Figure 12:
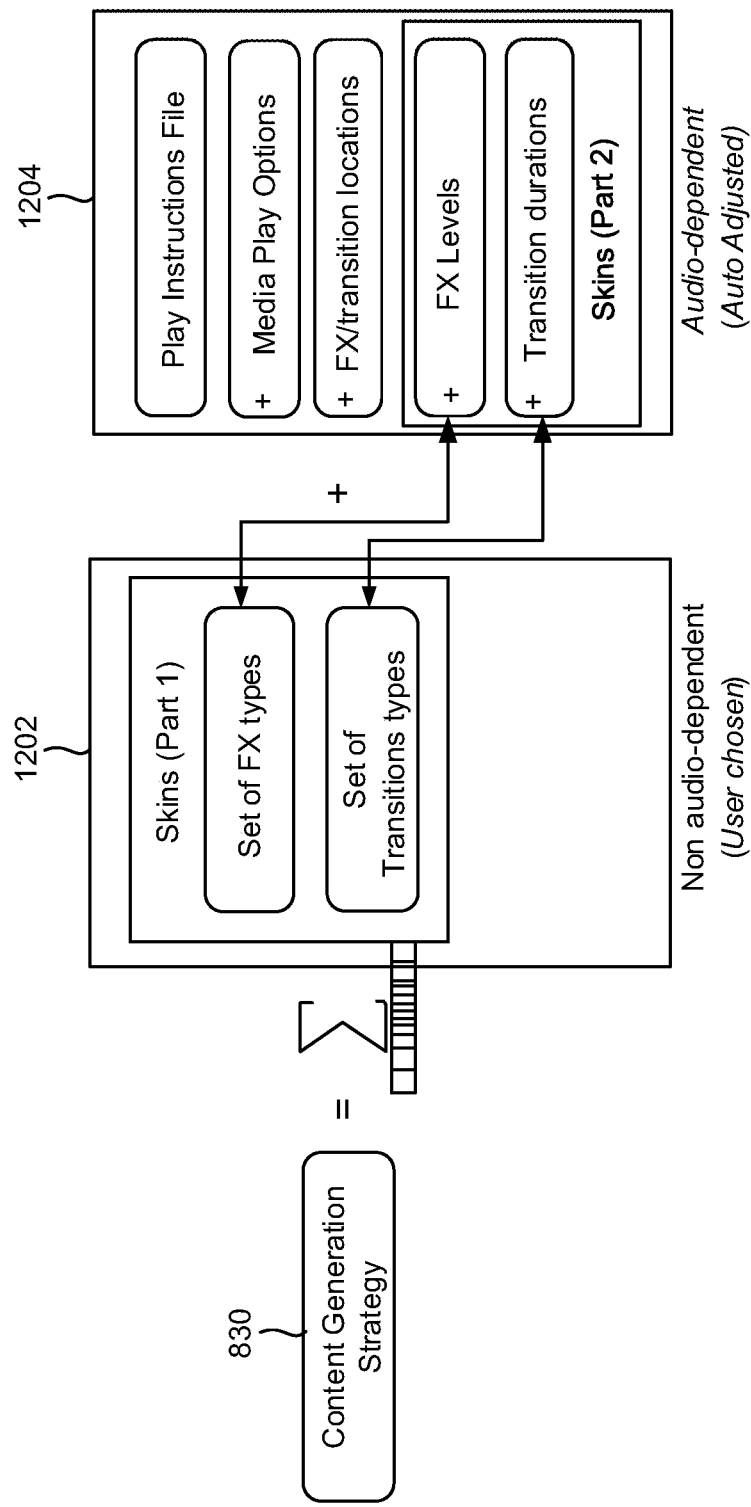
FIG. 12 illustrates components associated with an editing strategy template, in accordance with some examples.

FIG. 12 illustrates further details regarding the components associated with the content generation strategy template 830 described in FIG. 8. As illustrated in FIG. 12, the content generation strategy template 830 can include parts, an audio-dependent portion 1204 (which is automatically adjusted based on the underlying audio portion of the audio-video content) and a non audio-dependent portion 1202 (which parameters can be chosen by the user). The summation of these two portions 1202 and 1204 covers how a skin can automatically edit or apply effects to the video portion of the audio-video content. As described in the present application, any user selection of skins (or their associated activated properties/effects and transitions) correspond to user selection of the non-audio dependent portion 1202—this portion is what is displayed in the various spinners that allow users to select what skin to use. The audio-dependent portions 1204 may not selectable by the user but rather correspond to how the non-audio dependent portions are applied to the media content (e.g. video or photos).

With respect to the non audio-dependent portion 1202, a skin would include a set of activated properties and effects as well as transitions that would be used in connection with the video portion to be edited. Each skin may have a different combination of activated properties and effects as well as transitions. Since this part of the skin is not dependent on the audio-portion of the audio-video content, users or creative specialists are free to customize this aspect of the skin via, for example, the user interface illustrated in FIG. 10). Therefore, a user can select the skin, the song, and the media content. The skin can include the various effects that can be performed on the media content based on the song. The final product (e.g. a music video) can be generated without further actions from the user. Any customization regarding the activated properties and effects and transitions can be provided by users via an advanced editing/customization menu/feature.

With respect to the audio-dependent portion 1204, the skin would have the various parameters that would define (and be automatically adjusted according to the sections' average energy levels, transitions, beats, audio events levels, audio volume envelop, . . . ) how the video-portion of the audio-video content would be edited based on the underlying audio portion accompanying the video portion. The play instructions file, media play options, and the FX/transition locations are similar to the elements described above in FIG. 9. As noted above, the set of activated properties and effects and transitions that are associated with the skin are selected by the user. However, where the activated properties and effects and transitions as well as their respective levels (e.g. intensity) and duration are defined by the audio-portion (e.g. song).

Figure 13:
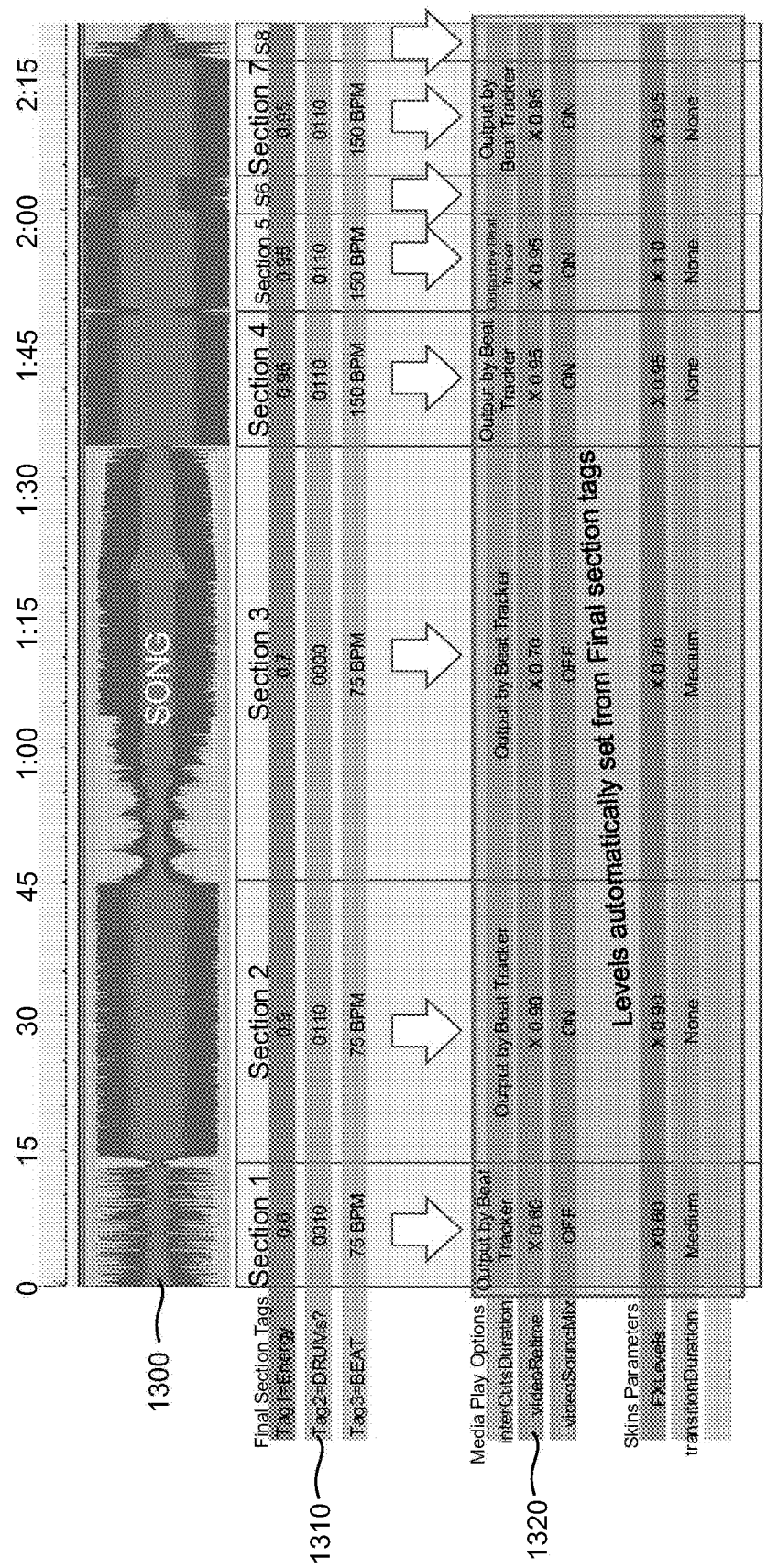
FIG. 13 illustrates processing a song using sections based on different levels associated with an audio portion of audio-visual content, in accordance with some examples.

FIG. 13 illustrates an exemplary embodiment according to the present technology described herein. A song 1300 may be converted into a form that can be processed using the level 1, level 2, and level 3 section breakdowns. Each of those individual section breakdowns would output a corresponding value 1310 that would characterize that section. Each section (e.g. section 1, section 2 . . . section 8) would have a different set of values 1310 based on the characteristics of the song. Based on the three calculated values 1310 obtained via the level one, level two, and level three section breakdowns, not only can the different sections of the song 1300 be identified but how a user selected skin would be implemented in editing the media content (e.g. video, photos) will be determined. The three values can be used to calculate a STUN value (as described above with respect to FIG. 7) that can be used to determine and modify how the activated properties/effects and transitions would be applied to the media content (e.g. video, photos).

In another embodiment according to the present technology, the activated properties/effects and transitions applied to the media content (e.g. video, photos) are locally driven by the individual audio events-levels, instead of being driven by the STUN, the latter operating at a section level.

Each of the skins that are selected for the section of the song 1300 have corresponding properties 1320 that would be used to automatically edit the corresponding video portion of the audio-video content that would be displayed during the play of the song. The skins, as defined by the properties 1320, would include the types of activated properties/effects and transitions that would automatically be implemented in the video portion. The location and extent (e.g. level, intensity, duration) would be based on the song 1300 as described above.

The example, illustrated in FIG. 13, provides an overview of how the video portion of the audio-video content can be automatically edited or generated based on the underlying audio-portion of the audio-video content. The technology described in the present application describes technology that is able to extract various properties and elements of the audio portion so that edits (based on a user selected skin) can automatically be made to the video portion based on the audio portion of the audio-video content.

Figure 14A:
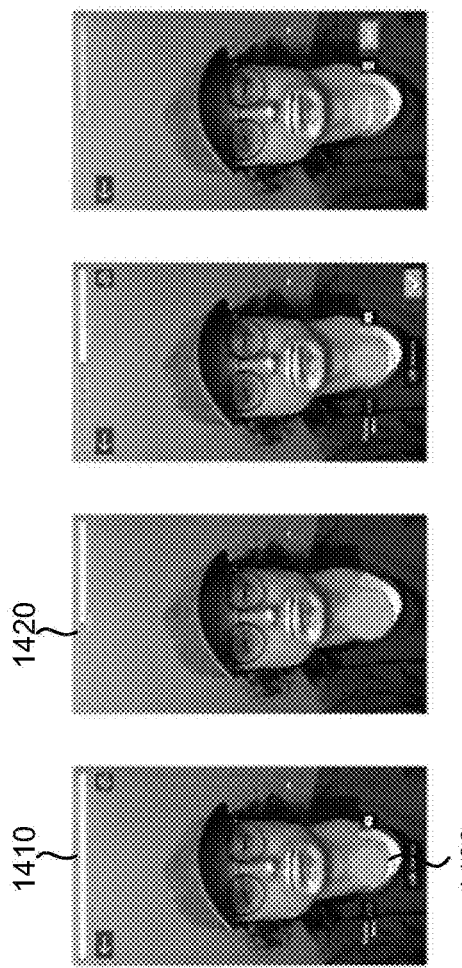
FIGS. 14A and 14B illustrate user interfaces for capturing video content, in accordance with some examples.
Figure 14B:
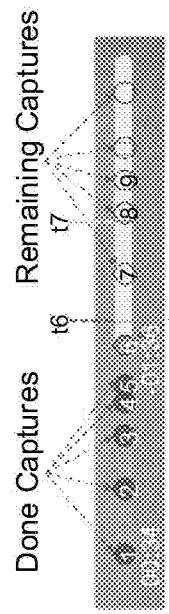

FIG. 14A and FIG. 14B illustrate example user interfaces for capturing "beat matched" video content. In particular, FIG. 14A illustrates a user interface that shows a user recording a video while FIG. 14B illustrates a progression bar which informs the user how long the video can be captured for.

In one example, a user may select a song (or portion of the song) which the user would like to pair with media content (e.g. video). The user would be able to capture video clips using their own computing device (e.g. camera on a smartphone) to correspond for the duration of the selected song.

There are various current applications that allow users to capture short video clips and share them with other users (e.g. Facebook and Instagram stories). Some applications can also even allow users to pair the video clip with music (e.g. TikTok). However, the present application includes improvements to the capture and sharing of short video clips by using music to automatically provide optimal cuts, visual effects and transitions to the short video clips. Such technology is not available with the current applications (e.g. Facebook, Instagram, TikTok, or others).

With respect to FIG. 14A, the user interface provides various elements that would facilitate "edit while capturing" of a video clip using, for example, the user's camera found on a mobile device (such as on a smart phone). The user interface may include a button 1400 that would be pressed in order to initiate and/or stop play of a selected song. As the song is being played, the camera would be used to capture video to be paired with the song. The user may be provided with a suggestion to stop/start its captures at particular time positions (ex: t6), which are positions matching the beat of the selected song. Eventually, a fully edited video clip (made of the several captures shot by the user) can be made available (and ready to share) as soon as the last capture has been completed.

As the user captures video for the video clip, a capture bar 1410 at the top of the user interface is used to assist the user to make its captures match the beat of the selected song. The whole capture bar 1410 can correspond to the duration of the accompanying song that the video clip will be paired with. As the user continues to record, the capture bar 1410 (which is initially empty) can gradually fill via a color indication, beat after beat. The filling of the capture bar 1410 is used to indicate the beat position of the accompanying song.

With respect to FIG. 14B, a further detailed illustration of the capture bar 1410, 1420 is provided. Point (t6) is corresponding to a beat position of the selected song and is used to reference a recommended start/stop for the video clip recording. The filled portion (corresponding to points t1-t5) pertain to other beat positions where the user has started/stopped video recording for the video clip. Points t7-t9 correspond to an empty portion of the capture bar that means that the user is still able to capture more video for the video clip. Each of the points (t1-t9) correspond to beat positions. Once the capture bar is completely full, the video capture is terminated: the video clip, while capturing, can thus be automatically generated or modified based on the selected skin and on the song that will be accompanying the video clip using the technology described above.

Figure 15:
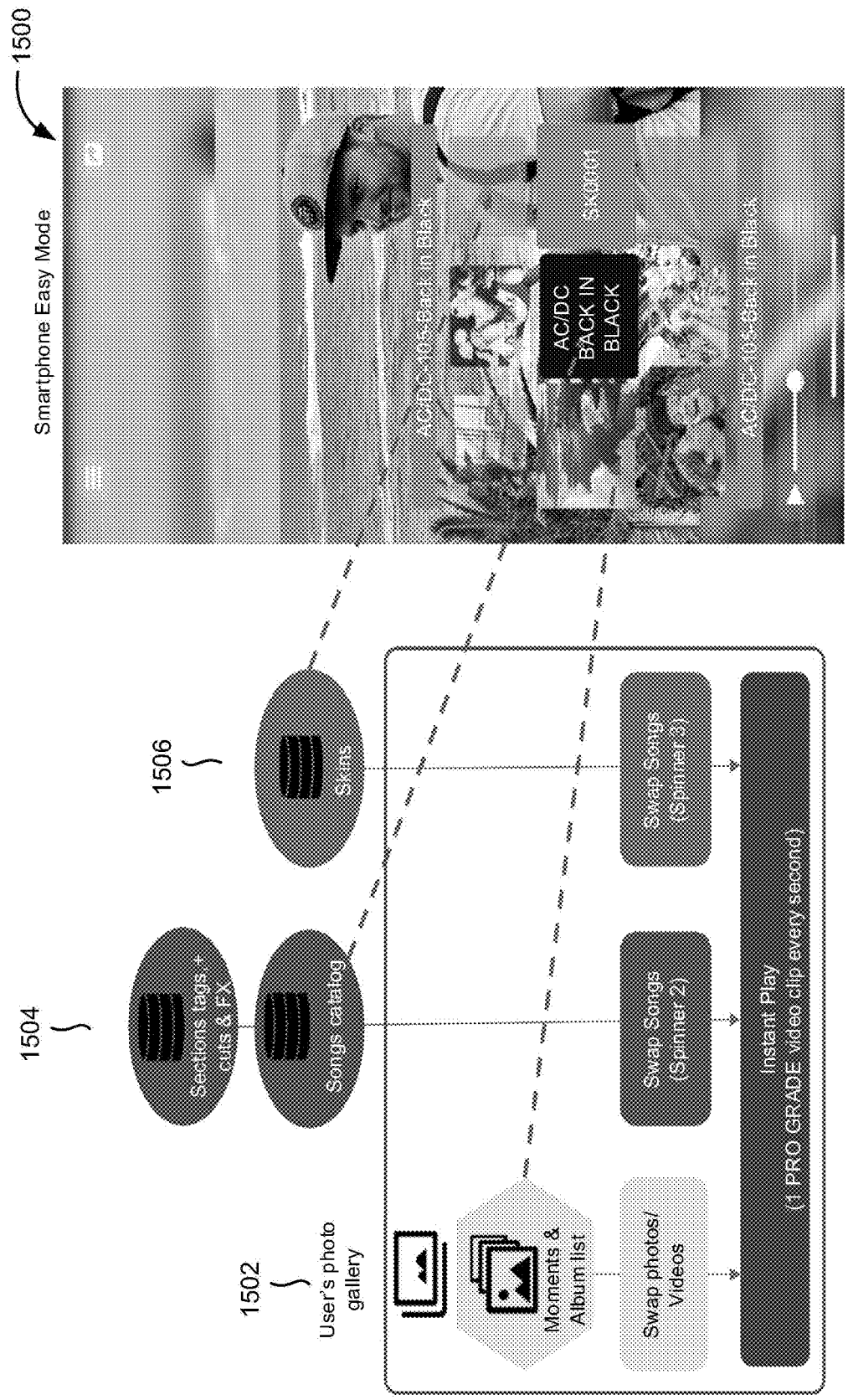
FIG. 15 illustrates a user interface for creating music video clips, in accordance with some examples.

FIG. 15 illustrates an exemplary interface 1500 for creating music video clips. The user interface 1500, as illustrated in the figure, is a simplified interface that splits into three "spinners" that users can select various elements from. These three spinners can be spun up and down (simulating a wheel) so that users can select particular elements. In some cases, a random selection of each of the elements can be chosen (for example, via the "spin" option much like a slot-machine). Other methodologies for selecting the different elements can also be possible, for example, via drop down menus that list the elements that can be chosen. Accordingly, the three spinners discussed in the following examples can include any suitable user interface for presenting elements to a user for receiving user input, and based on the received user input, providing a corresponding selection of the elements for generation of media content according to this disclosure.

The first spinner 1502 is a first user interface that the user can select, and is also referred to a media spinner (which corresponds to media that the user can select). Each thumbnail on the first spinner 1502 corresponds to a set of images, photographs, and videos (so called Moments or Albums) that users may have on their computing device. The media content may also correspond to the user's own collection of photos and videos that have been captured using the user's device.

The second spinner 1504 is a second user interface that corresponds to a variety of different songs that can be paired with the first spinner 1502 (e.g. media spinner). In the second spinner 1504, the user can select a song that the user would like to pair with the selected video or set of photos selected via the first spinner 1502 or media spinner. The songs may be songs that the user has downloaded and stored on the user device (e.g. personal playlist), or the ones provided by an external service (e.g. Spotify). The songs may also be downloaded from the Internet or obtained from other devices.

The third spinner 1506 is a third user interface that corresponds to the skin that will be applied to the media content (selected via the first spinner 1502 or the media spinner). The skin has a pre-determined set of properties, effects, and transitions that will be automatically applied to the selected media in accordance to the properties and events associated with the selected song (via the second spinner 1504 or song spinner). The skins may be ones that are default to the video editing application, created by the user, or downloaded from other users or other sources (e.g. Internet).

In one embodiment, the applicable skins may be obtained from a larger database of available skins and provided in the third spinner 1506. In another embodiment, the third section may include all the available skins that the user has favorited, used in the past, or are suggested to the user based on preferences.

Whether the user selects elements from the different spinners to combine or a random set of elements are chosen, the user interface can automatically combine the media content with the song and perform video edits/add effects to the media content based on the selected skin. How the edits are made or effects are added to the media content can be based on the song using the technology described above.

A "preview," or in some cases, the final product (e.g. the audio-video content generated from the selection of the media content, song, and skin) can be provided in a pre-determined space once the media, the song and the skin has been selected. The user can instantly view the "preview" or final product using the user interface.

Figure 16:
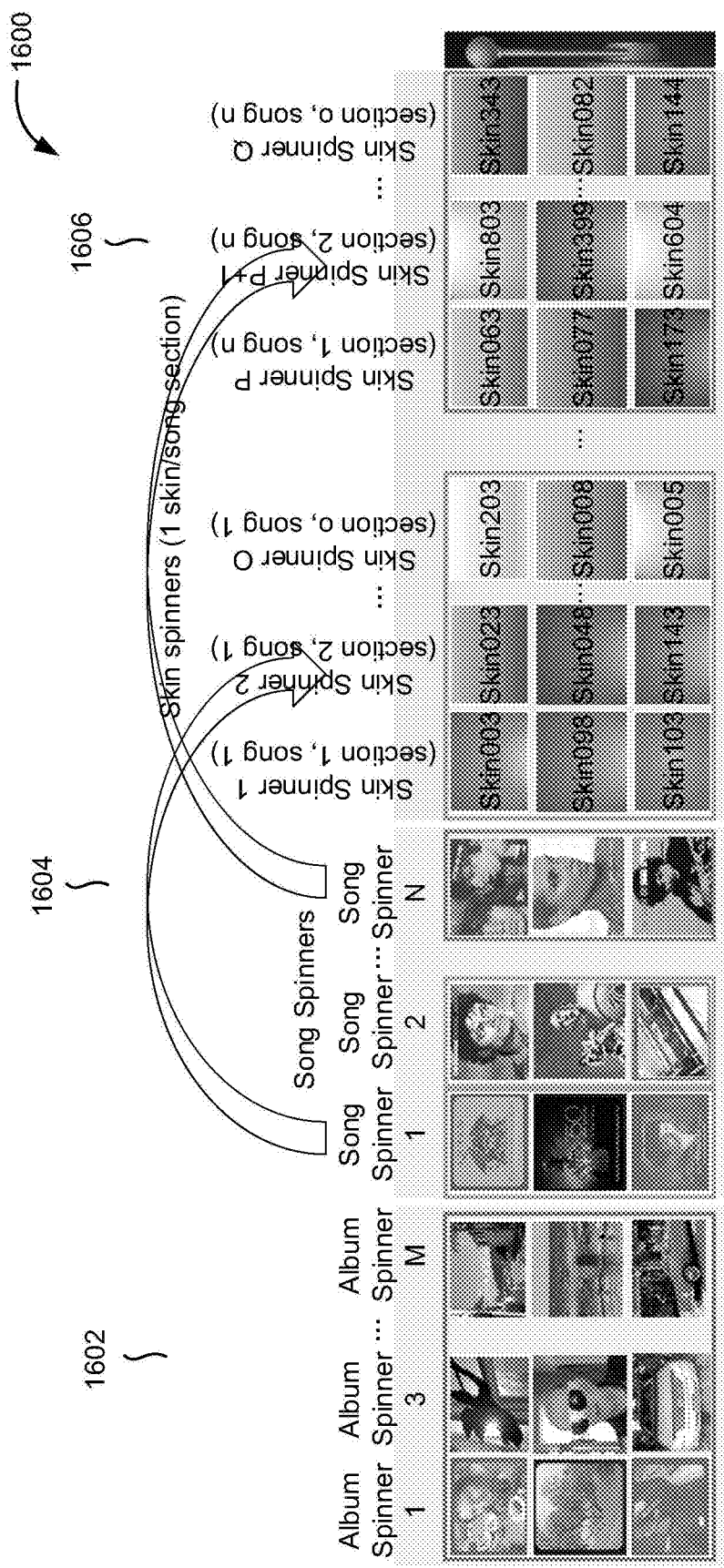
FIG. 16 illustrates a user interface for creating music video clips, in accordance with some examples.

FIG. 16 illustrates a more complex user interface 1600 for creating music video clips. Instead of just showing three spinners each with a row of elements that can be selected as in FIG. 15, the user interface of FIG. 16 has a variable number of rows in each respective spinner that the user can select from. This allows users the ability to combine multiple media sets, multiple songs, and multiple skins altogether into a single audio-video content file.

The selection of multiple different media content (e.g. video, photo) from the available media sets can be appended one after the other as illustrated in the first set of spinners 1600. Furthermore, for each set of media (e.g. photos, video from albums or Moments) selected from the first set of spinners 1602, users can select any number of different songs (from the second set of spinners 1604) to be associated with the media content file obtained from the first set of spinners 1602. The second set of spinners 1604 can provide the user the ability to select from any number of different songs. The user can select a single song for one or more of the media content files selected from the first set of spinners 1602. For example, one song could be selected from the second set of spinners 1604 to be played for the entire duration of the media content selected from the first set of spinners 1602. In other embodiments, users can select a song for each media content file selected. Using the example above, a user can select three different songs from the second set of spinners 1604 such that a first song is played while a first media set is being displayed, a second song is played while a second media set is displayed, and a third song is played while a third media set is being played.

Depending on the duration of the selected song from the second set of spinners 1604, the selected song may have one or more distinct sections. Each section may itself be associated with its own respective skins. For longer songs, the third set of spinners 1606 may provide the ability for the user to select a particular skin for each section of the selected song.

Much like the user interface in FIG. 15, users can select each of the elements from the three set of spinners so that an audio-video content file can be created based on the user selection. However, it is also possible to create a random audio-video content file via the "spin" element 1606. If selected, the application can select a random set of media content from the first set of spinners 1602, a random set of songs from the second set of spinners 1604, and a random set of skins from the third set of spinners 1606. In some cases, the user can provide some preferences that can influence the random selection (e.g. narrow the available pool of possible selections).

Figure 17:
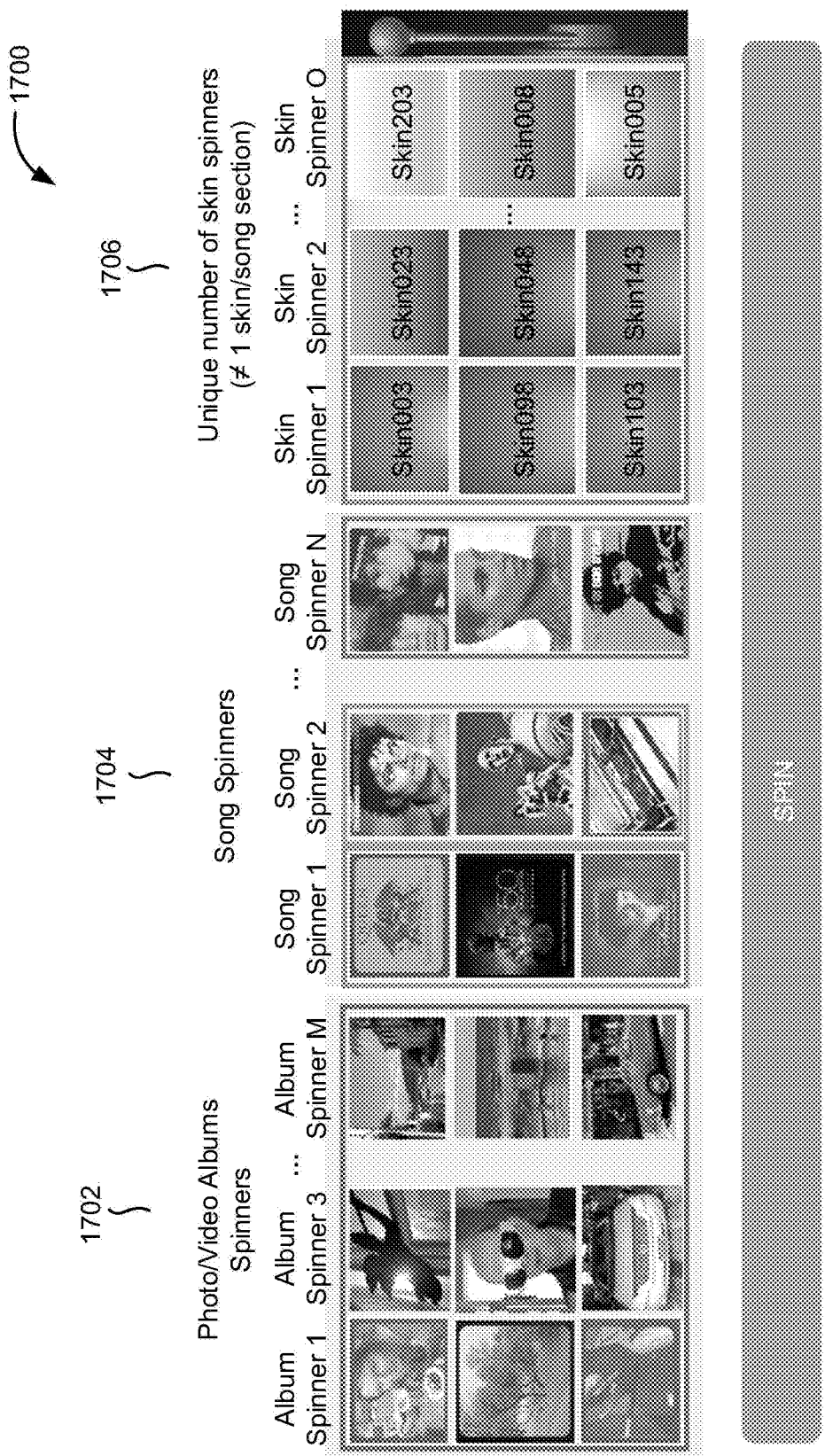
FIG. 17 illustrates a user interface for creating music video clips, in accordance with some examples.

FIG. 17 is another exemplary user interface 1700 for creating music video clips where the number of Skin Spinners is set to a given limited value (example 4), independently from the total number of sections of the selected songs. Much like FIGS. 15 and 16, users can select media content, songs, and skins using the spinners 1702, 1704, and 1706, respectively, that are provided in the user interface. If the selected song is made of 10 different sections, for example, each section of the song can be randomly matched with one of the 4 selected skins, for example, using various possible rules defined by the application for creating music video clips or based on user preference. This embodiment allows the number of spinners not to vary depending on songs sections, and therefore to keep the wheel structure (if not, the number of spinners could change each time a new song would be selected). It should be noted that it would be possible to allow users to specifically select which skin could be applied to each of the 10 different sections, for example.

Figure 18:
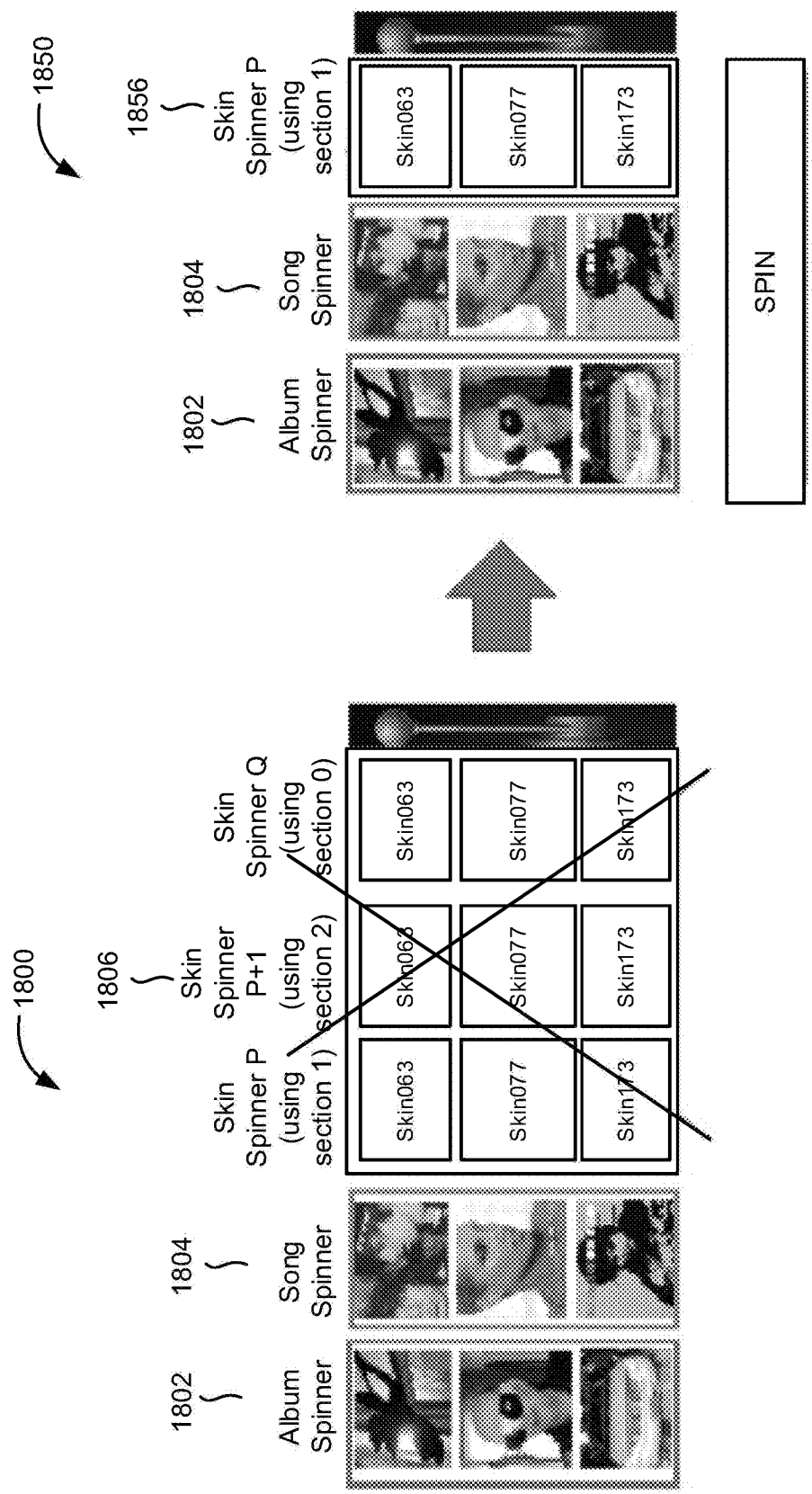
FIG. 18 illustrates aspects of switching from a general case user interface to a simplified interface for creating music video clips, in accordance with some examples.

FIG. 18 illustrates how to switch from general case user interface 1800 to simplified interface 1850 for creating music video clips. While in the user interface 1800, a media spinner 1802, song spinner 1804, and skin spinner 1806 with multiple skins for each row are provided, in the simplified interface 1850, the media spinner 1802, song spinner 1804, and skin spinner 1856 are provided with only one row, for media sets, songs, and skins. As an "easy mode" users can be restricted to select only one set of media (e.g. albums/moments), one audio file (e.g. song), and one skin to combine using the interface 1850. In this embodiment, the same skin can be applied to all sections of the selected song (compared to the above embodiments where it would be possible to select different skins for different sections of the selected song. This "easy mode" is the same as illustrated in FIG. 15. There may be, however, alternative modes that provide more or less options for the user to select from different media, songs, and/or skins.

Figure 19:
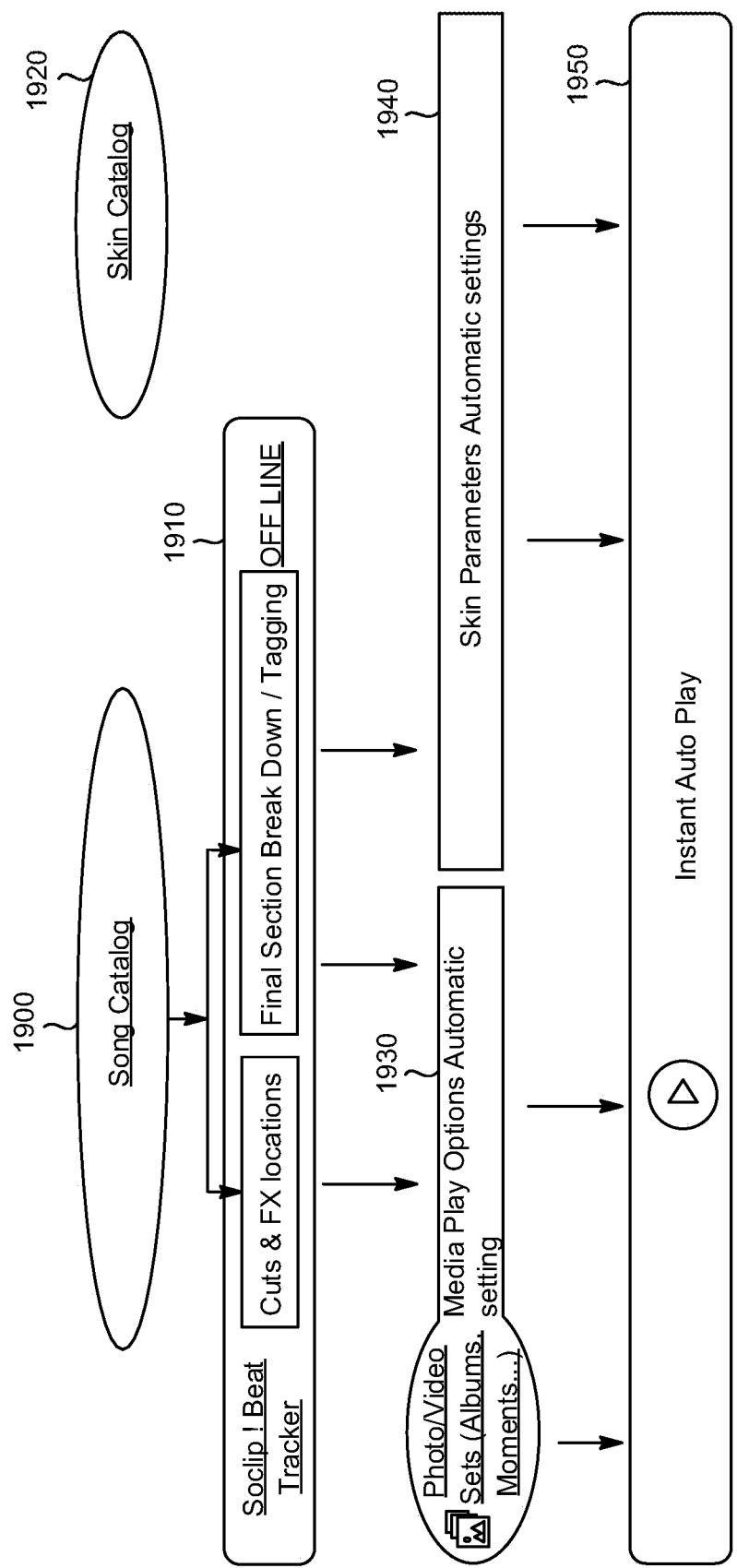
FIG. 19 illustrates components involved in video editing, in accordance with some examples.

FIG. 19 is an illustration of the various components involved in video content generation using the technology described in the present application. The video content generation platform may be associated with a video editing/content generation application that can be downloaded and run on a user computing device (e.g. mobile device). The video editing/content generation platform can also be run on a cloud-based server and accessed via each user computing device connected to the cloud server.

The video editing/content generation platform may have a song catalog 1900 that can be used to store songs that could be combined with media content (e.g. video, pictures). A processor 1910 that includes the technology described above can then process the chosen song. If the video editing/content generation platform is being run on the user computing device, the processing of Play Instruction Files can be performed offline. The processor 1910 would run various steps in order to identify the sections of the song, calculate STUN values for each of the sections, and identify the parameters associated with the sections of the song used to instruct how to apply the activated properties/effects and transitions associated with a user selected skin to edit the accompanying media content (e.g. photo, video).

The video editing/content generation platform may also have a skin catalog 1920. The skin catalog 1920 may include all available skins that can be applied to any number of different media content. The skin catalog may organize the available skins based on, for example those skins that are sponsored, community created, and popular.

The video editing/content generation platform may also include a media database 1930. The media database 1930 may have all the media content (e.g. video, photos) that the user has captured using their user computing device. The user can select one or more set of media (automatically assembled by chronologic proximity, or by pre-created albums) from the media content database 1930 to incorporate with a song from the song catalog 1900 using the video editing/content generation platform of FIG. 19. In some cases, the media database 1930 may also include media content that has been downloaded from the Internet.

The video editing/content generation platform also has an automated skin parameter setting module 1940. The module 1940 would be used to identify the various automatic activated properties/effects and transitions that would be applied to the media content. As described above, skins include a pre-defined set of instructions that would be used to automatically perform video editing on the media content (e.g. video, picture) which would be dependent on the song that will be played with the media content. The song can automatically instruct where and how the video edits (which are associated with the user selected skin) are performed with respect to the media content.

Once the user has positioned the 3 spinners, the generated "music video" can then be provided to the user to be viewed on their user device 1950. The "music video" can be generated in real time, while the selected song is played (or streamed). The user can also choose, for example, to save the generated "music video" as a MP4 encoded video, share the "music video" with others, or upload the "music video" to the cloud so that others can view, download, and share the "music video."

Figure 20:
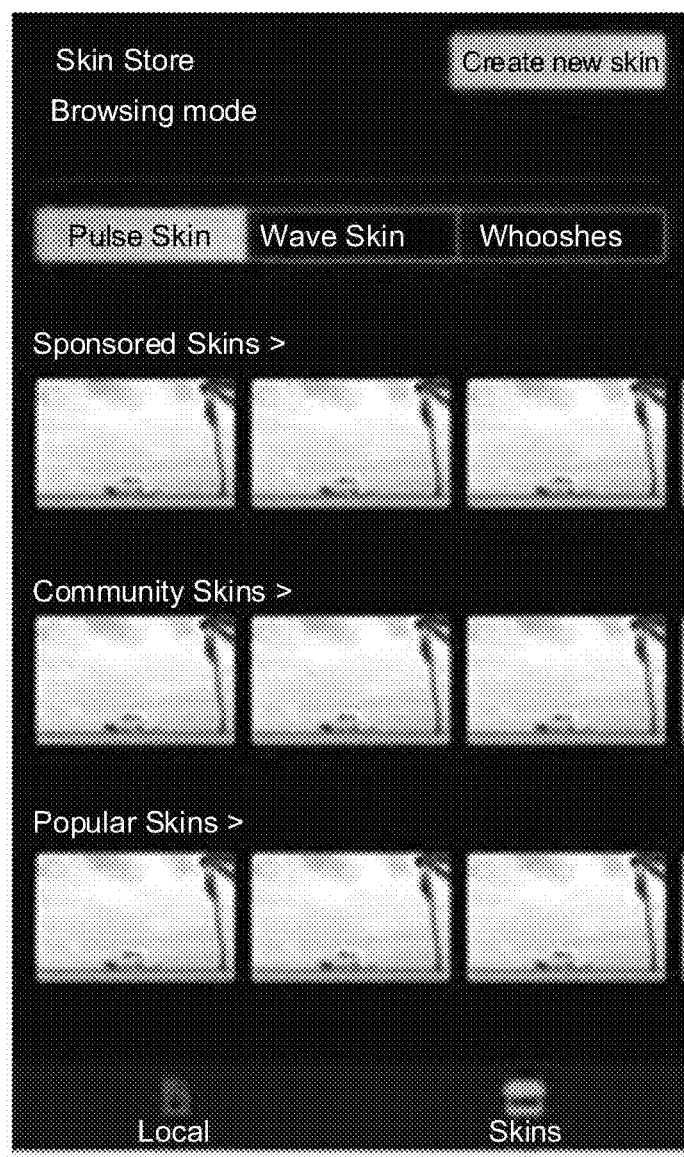
FIG. 20 illustrates a skin store including a collection of skins, in accordance with some examples.

FIG. 20 illustrates an exemplary skin store 200. As described above, in connection with FIG. 10 with user capabilities of customizing and saving their own skins, a skin store can be created that would allow other users to view different skins and download them for use on their own devices. Skins that are created by individuals can be uploaded to a specific server in the cloud that can be used to store the skin for future distribution. Once stored, the skin can be organized in various categories, for example, based on type, author, date created/uploaded. Other organizations can also include whether the skin is a sponsored skin or whether the skin was created by the community.

Information about the skin can also be collected and stored that would be used to further organize the skin. For example, ratings (e.g. other user comments about the skin, like, dislike) and the number of downloads/uses of that skin can be captured. This information could be used to identify popular skins. Based on being popular, these skins can be highlighted and be made more easily visible for others to view and download.

Users would have the freedom to search through all the skins available on the skin store as well as filter skins based on various parameters. As described above more or less than the various parameters described above may be used such as filtering by author, rating, popularity, sponsored, community, upload date, name, and/or type. Furthermore, the filtering can take advantage of one or more of the parameters at the time in order to look for a specific skin.

The skin store 2000, may include functionality in order to include features that facilitate monetization. For example, users may be charged a fee for downloading and using specific skins. In some cases, skins may be downloaded for free and used as desired. However, other skins may also be free but may be limited in use (e.g. can only edit audio-video content of a limited nature such as 30 seconds). A fee can be paid in order to "unlock" unlimited use for that skin. Users may also be charged a subscription fee to have unlimited access to all the skins with no limitations for a pre-determined period of time. Other ways of monetizing may include requiring users to view ads before and/or after use of the skin to edit audio-video content. There may be any number of different ways to monetize the skins found on the skin shop and any method that is known may be incorporated with the skins.

Figure 21:
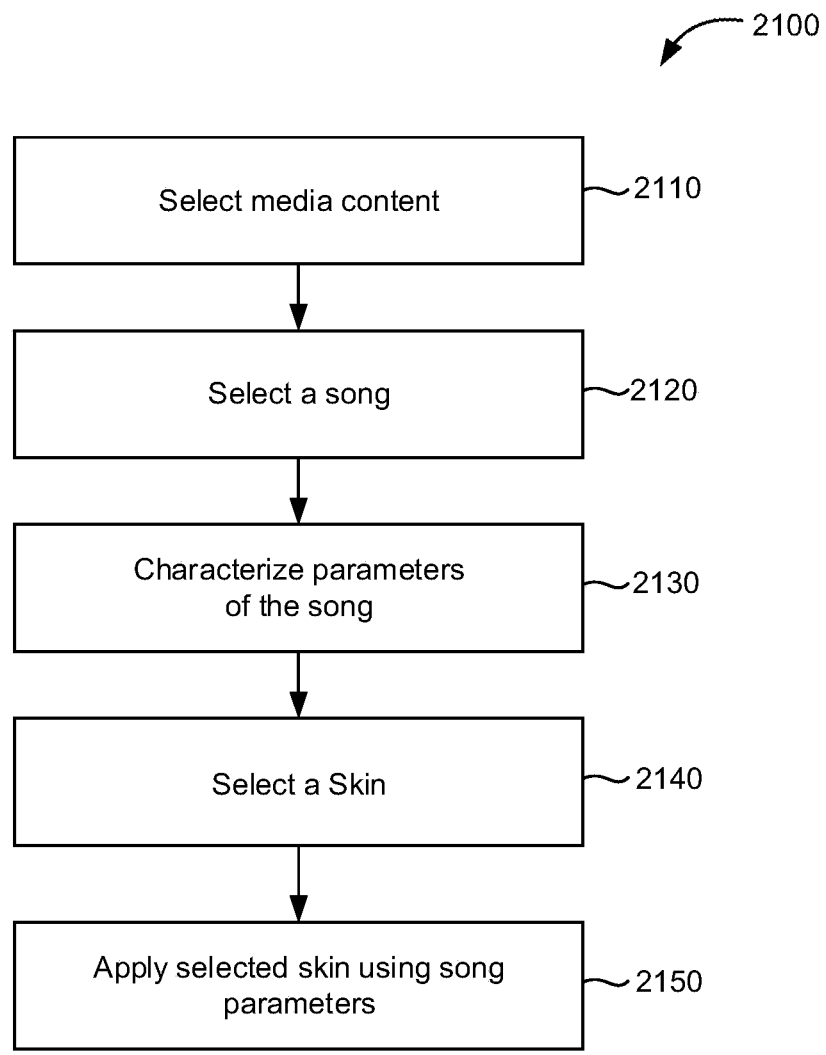
FIG. 21 illustrates a process of creating music video clips, in accordance with some examples.

It will be appreciated that exemplary aspects include various methods for performing the processes, functions and/or algorithms disclosed herein. For example, FIG. 21 illustrates an exemplary method 2100 of generating media content. In some examples, the method 2100 may be used for creating music video clips. In particular, the method 2100 described is an automated method that perform edits or creates effects to be included on media content based on the underlying audio (e.g. song) associated with the media content. It will be appreciated that although the exemplary method 2100 is described as a sequence of steps below, alternative sequences or combinations of the steps are within the scope of this disclosure.

In step 2110, a user can select media content (e.g. pictures, videos) that do not have accompanying music. For example, the media content can include a media file which excludes an audio file. The media content corresponds to content that may be captured and stored on the user device. In some cases, the media content can be obtained from other sources (e.g. Internet, other computing devices). In some examples, selecting the media content can include obtaining a media file from one or more images, photographs, or videos, based on receiving a first user input from a first user interface. For example, the first user interface can include a first spinner (e.g., 1502, 1602, 1702, 1802) or other suitable display/selection interface/picking solution for displaying visual representations of the one or more images, photographs, or videos and receiving a selection of the one or more images, photographs, or videos corresponding to the first user input. The selected media (e.g., images, photographs, videos, etc.) can be combined with audio content and edited/modified based on a selected skin and the audio content as described further below.

In step 2120, a user may select a song or other audio. For example, selecting the song or audio can include obtaining an audio file from one or more music, song, or other audio data, based on receiving a second user input from a second user interface. In some examples, the second user interface can include a second spinner (e.g., 1504, 1604, 1704, 1804) or other suitable display/selection interface/picking solution for displaying visual representations of the one or more music, song, or other audio data and receiving a selection of the one or more music, song, or other audio data corresponding to the second user input. In some examples, the song may be one that not only can be paired with the selected media content (e.g. images, pictures, videos) but may influence how activated properties/media effects or transitions can be performed on the selected media content. For example, the elements and events that occur within the song can be used to automate the editing performed on the selected media content.

In step 2130, the selected song can be processed in order to characterize parameters (e.g. elements/events) that can be used to apply various activated properties/effects and transitions. For example, processing the song can include processing an audio file to determine one or more parameters of the audio file. In some examples, such processing can include determining one or more sections of the audio file, wherein each of the one or more sections comprises substantially uniform energy levels, with transitions in energy levels between adjacent sections corresponding to beats and determining, one or more characteristics for each of the one or more sections, the one or more of characteristics including energy levels, number of beats-per-minute, or types of drum hits. The processing can further include determining a section type unique number (STUN) for each of the one or more sections based on the one or more characteristics for each of the one or more sections, wherein the one or more parameters of the audio file are based on the STUN for each of the one or more sections of the audio file.

For example, processing of the audio content or audio file may include identifying one or more sections of the audio content (e.g. song) where each section has content of similar characteristics such as substantially uniform energy levels. The sections having similar or uniform characteristics can be identified based on the performance of various processes (e.g. low-pass filter, double-envelope, beat tracking, beat matching) to characterize the elements/events associated with the audio content.

Based on the outcome of the processes, each of the sections may be associated with various values denoting, for example, energy levels, beats-per-minute, and number of drum hits. These values can be used to calculate corresponding STUN values that may be used to instruct how the activated properties/effects and transitions of the user selected skin (in step 2140) are implemented in editing the selected media.

In step 2140, users can select a skin. The skin includes a definition of all the different activated properties/effects and transitions that will be automatically applied to the selected media, text boxes and overlay boxes based on the song that is selected. In some examples, based on a skin associated with the audio file, one or more media effects corresponding to the one or more parameters of the audio file can be determined. In some examples, selecting the skin can include obtaining the skin from one or more skins comprising media effects, based on receiving a third user input from a third user interface, where the third user interface can include a third spinner (e.g., 1506, 1606, 1706, 1806/1856) or other suitable display/selection interface/picking solution for displaying visual representations of the one or more skins and receiving a selection of the one or more skins corresponding to the third user input.

In step 2150, the selected skin can be used to automatically perform edits or add effects to the media content. For example, using the skin to automatically perform edits or add effects to the media content can include applying the one or more media effects to a media file to generate a modified media file (e.g., a media file with the effects applied). Further, an audio-video file can be generated comprising a combination of the audio file and the modified media file. In some examples, the skin can use the parameters determined from the audio file to identify how the media effects (e.g., activated properties, transitions, or others) are applied to the selected media file. For example, whenever a kick or snare occurs within the song, a corresponding activated property or effect may be applied to the media content, that can be moreover applied sensibly proportionally to the kick or snare local intensity. These implementations of the effects implemented in the media content generate the modified media file. Generating the modified media file can be an automated process, dependent on the underlying song or audio that will be associated with the media content in the audio-video file that is generated using the song in combination with the modified media file.

In various examples, one or more media effects which can be applied to the media content can include one or more edits comprising changing aspects of the media file to incorporate one or more of zoom, color translations, or brightness adjustments; transitions comprising one or more crossfade, or dissolve effects; or adjusting one or more levels of intensity, speed, or duration associated with displaying the media content. In some examples, the same media content may have different types of edits and how those edits can be applied to the media content may also be different based on the song that is chosen to be played with the media content.

FIG. 22 illustrates an exemplary play instruction file. As noted above, in FIG. 9, the play instruction file (or sync file) includes the instructions to automate the editing of the video portion in a manner similar to how a professional video editor would have edited it if performed by an individual. The instructions can include cuts 2202 and FX positions 2204, the transition positions and durations (e.g., sections 1-4, begin time 2206, end time 2208, etc.), and other song related data. The example play instruction, illustrated in FIG. 22, shows some of the instructions that highlights where, for example, effect locations 2204 and cut locations 2202 are within the audio-video file.

Although a variety of examples are provided to explain aspects within the scope of the disclosed technology, no limitation of the technology should be implied based on particular features or arrangements in such examples, as one of ordinary skill would be able to use these examples to derive a wide variety of implementations. Further and although some subject matter may have been described in language specific to examples of structural features and/or method steps, it is to be understood that the disclosed subject matter is not necessarily limited to these described features or acts. For example, such functionality can be distributed differently or performed in components other than those identified herein. Rather, the described features and steps are disclosed as examples of components of systems and methods within the scope of the disclosure.

Illustrative examples of the disclosure include:

Aspect 1: A method of generating media content, the method comprising: processing an audio file to determine one or more parameters of the audio file, wherein processing the audio file comprises: determining, one or more characteristics for the audio file, the one or more of characteristics comprising one or more of: an occurrence of drum hits, types of drum hits, intensities of drum hits or distance between drum hits sequences, an occurrence of down beats, an occurrence of up beats, intensities of down beats and up beats; determining, based on a skin associated with the audio file, one or more media effects that will be applied based on the one or more characteristics of the audio file; applying the one or more media effects to a media file to generate a modified media file; and generating an audio-video file comprising a combination of the audio file and the modified media file.

Aspect 2: The method of aspect 1, further comprising: obtaining the media file from one or more images, photographs, or videos, based on receiving a first user input from a first user interface.

Aspect 3: The method of any of aspects 1-2, wherein the first user interface comprises a first spinner for displaying visual representations of the one or more images, photographs, or videos and receiving a selection of the one or more images, photographs, or videos corresponding to the first user input.

Aspect 4: The method of any of aspects 1-3, further comprising: obtaining the audio file from one or more music, song, or other audio data, based on receiving a second user input from a second user interface.

Aspect 5: The method of aspects 1-4, wherein the second user interface comprises a second spinner for displaying visual representations of the one or more music, song, or other audio data and receiving a selection of the one or more music, song, or other audio data corresponding to the second user input.

Aspect 6: The method of aspects 1-5, further comprising: obtaining the skin from one or more skins comprising media effects, based on receiving a third user input from a third user interface.

Aspect 7: The method of aspects 1-6, wherein the third user interface comprises a third spinner for displaying visual representations of the one or more skins and receiving a selection of the one or more skins corresponding to the third user input.

Aspect 8: The method of aspects 1-7, wherein the one or more media effects comprise one or more of: edits comprising changing aspects of the media file to incorporate one or more of zoom, color translations, or brightness adjustments; transitions comprising one or more crossfade, or dissolve effects; or adjusting one or more levels of intensity, speed, or duration associated with displaying the media content.

Aspect 9: A system, comprising: one or more processors; and a non-transitory computer-readable storage medium containing instructions which, when executed on the one or more processors, cause the one or more processors to perform operations for generating media content, the operations including: determining, one or more characteristics for an audio file, the one or more characteristics comprising one or more of: an occurrence of drum hits, types of drum hits, intensities of drum hits or distance between drum hits sequences, an occurrence of down beats, an occurrence of up beats, intensities of down beats and up beats; determining, based on a skin associated with the audio file, one or more media effects that will be driven by the one or more characteristics of the audio file; applying the one or more media effects to a media file to generate a modified media file; and generating an audio-video file comprising a combination of the audio file and the modified media file.

Aspect 10: The system of aspect 9, wherein the processors are further configured to perform operations comprising: obtaining the media file from one or more images, photographs, or videos, based on receiving a first user input from a first user interface.

Aspect 11: The system of any of aspects 9-10, wherein the first user interface comprises a first spinner for displaying visual representations of the one or more images, photographs, or videos and receiving a selection of the one or more images, photographs, or videos corresponding to the first user input.

Aspect 12: The system of any of aspects 9-11, wherein the processors are further configured to perform operations comprising: obtaining the audio file from one or more music, song, or other audio data, based on receiving a second user input from a second user interface.

Aspect 13: The system of aspects 9-12, wherein the second user interface comprises a second spinner for displaying visual representations of the one or more music, song, or other audio data and receiving a selection of the one or more music, song, or other audio data corresponding to the second user input.

Aspect 14: The system of aspects 9-13, wherein the processors are further configured to perform operations comprising: obtaining the skin from one or more skins comprising media effects, based on receiving a third user input from a third user interface.

Aspect 15: The system of aspects 9-14, wherein the third user interface comprises a third spinner for displaying visual representations of the one or more skins and receiving a selection of the one or more skins corresponding to the third user input.

Aspect 16: The system of aspects 9-15, wherein the one or more media effects comprise one or more of: edits comprising changing aspects of the media file to incorporate one or more of zoom, color translations, or brightness adjustments; transitions comprising one or more crossfade, or dissolve effects; or adjusting one or more levels of intensity, speed, or duration associated with displaying the media content.

Aspect 17: A non-transitory computer-readable medium having stored thereon instructions that, when executed by one or more processors, cause the one or more processors to perform operations comprising: determining, one or more characteristics for an audio file, the one or more characteristics comprising one or more of: an occurrence of drum hits, types of drum hits, intensities of drum hits or distance between drum hits sequences, an occurrence of down beats, an occurrence of up beats, intensities of down beats and up beats; determining, based on a skin associated with the audio file, one or more media effects that will be applied based on the one or more characteristics of the audio file; applying the one or more media effects to a media file to generate a modified media file; and generating an audio-video file comprising a combination of the audio file and the modified media file.

Aspect 18: The non-transitory computer-readable medium of aspect 17, wherein the instructions are further configured to cause the one or more processors to perform operations comprising: obtaining the media file from one or more images, photographs, or videos, based on receiving a first user input from a first user interface.

Aspect 19: The non-transitory computer-readable medium of any of aspects 17-18, wherein the first user interface comprises a first spinner for displaying visual representations of the one or more images, photographs, or videos and receiving a selection of the one or more images, photographs, or videos corresponding to the first user input.

Aspect 20: The non-transitory computer-readable medium of any of aspects 17-19, wherein the instructions are further configured to cause the one or more processors to perform operations comprising: obtaining the audio file from one or more music, song, or other audio data, based on receiving a second user input from a second user interface.

What is claimed is:

1. A method of generating media content, the method comprising:
   processing an audio file to determine one or more parameters of the audio file, wherein processing the audio file comprises:
      determining one or more characteristics for the audio file, the one or more of characteristics comprising one or more of: an occurrence of drum hits, types of drum hits, intensities of drum hits or distance between drum hits sequences, an occurrence of down beats, an occurrence of up beats, intensities of down beats and up beats;
      determining, based on a skin associated with the audio file, one or more media effects that will be applied based on the one or more characteristics of the audio file;
      applying the one or more media effects to a media file to generate a modified media file; and
      generating an audio-video file comprising a combination of the audio file and the modified media file.

2. The method of claim 1, further comprising:
   obtaining the media file from one or more images, photographs, or videos, based on receiving a first user input from a first user interface.

3. The method of claim 2, wherein the first user interface comprises a first spinner for displaying visual representations of the one or more images, photographs, or videos, and receiving a selection of the one or more images, photographs, or videos corresponding to the first user input.

4. The method of claim 1, further comprising:
   obtaining the audio file from one or more music, song, or other audio data, based on receiving a second user input from a second user interface.

5. The method of claim 4, wherein the second user interface comprises a second spinner for displaying visual representations of the one or more music, song, or other audio data, and receiving a selection of the one or more music, song, or other audio data corresponding to the second user input.

6. The method of claim 1, further comprising:
   obtaining the skin from one or more skins comprising media effects, based on receiving a third user input from a third user interface.

7. The method of claim 6, wherein the third user interface comprises a third spinner for displaying visual representations of the one or more skins, and receiving a selection of the one or more skins corresponding to the third user input.

8. The method of claim 1, wherein the one or more media effects comprise one or more of:
   edits comprising changing aspects of the media file to incorporate one or more of zoom, color translations, or brightness adjustments;
   transitions comprising one or more crossfade, or dissolve effects; or
   adjusting one or more levels of intensity, speed, or duration associated with displaying the media content.

9. A system, comprising:
   one or more processors; and
   a non-transitory computer-readable storage medium containing instructions which, when executed on the one or more processors, cause the one or more processors to perform operations for generating media content, the operations including:
      determining one or more characteristics for an audio file, the one or more characteristics comprising one or more of: an occurrence of drum hits, types of drum hits, intensities of drum hits or distance between drum hits sequences, an occurrence of down beats, an occurrence of up beats, intensities of down beats and up beats;
      determining, based on a skin associated with the audio file, one or more media effects that will be driven by the one or more characteristics of the audio file;
      applying the one or more media effects to a media file to generate a modified media file; and
      generating an audio-video file comprising a combination of the audio file and the modified media file.

10. The system of claim 9, wherein the processors are further configured to perform operations comprising:
    obtaining the media file from one or more images, photographs, or videos, based on receiving a first user input from a first user interface.

11. The system of claim 10, wherein the first user interface comprises a first spinner for displaying visual representations of the one or more images, photographs, or videos, and receiving a selection of the one or more images, photographs, or videos corresponding to the first user input.

12. The system of claim 9, wherein the processors are further configured to perform operations comprising:
  obtaining the audio file from one or more music, song, or other audio data, based on receiving a second user input from a second user interface.

13. The system of claim 12, wherein the second user interface comprises a second spinner for displaying visual representations of the one or more music, song, or other audio data, and receiving a selection of the one or more music, song, or other audio data corresponding to the second user input.

14. The system of claim 9, wherein the processors are further configured to perform operations comprising:
  obtaining the skin from one or more skins comprising media effects, based on receiving a third user input from a third user interface.

15. The system of claim 14, wherein the third user interface comprises a third spinner for displaying visual representations of the one or more skins, and receiving a selection of the one or more skins corresponding to the third user input.

16. The system of claim 9, wherein the one or more media effects comprise one or more of:
  edits comprising changing aspects of the media file to incorporate one or more of zoom, color translations, or brightness adjustments;
  transitions comprising one or more crossfade, or dissolve effects; or
  adjusting one or more levels of intensity, speed, or duration associated with displaying the media content.

17. A non-transitory computer-readable medium having stored thereon instructions that, when executed by one or more processors, cause the one or more processors to perform operations comprising:
  determining one or more characteristics for an audio file, the one or more characteristics comprising one or more of: an occurrence of drum hits, types of drum hits, intensities of drum hits or distance between drum hits sequences, an occurrence of down beats, an occurrence of up beats, intensities of down beats and up beats;
  determining, based on a skin associated with the audio file, one or more media effects that will be applied based on the one or more characteristics of the audio file;
  applying the one or more media effects to a media file to generate a modified media file; and
  generating an audio-video file comprising a combination of the audio file and the modified media file.

18. The non-transitory computer-readable medium of claim 17, wherein the instructions are further configured to cause the one or more processors to perform operations comprising:
  obtaining the media file from one or more images, photographs, or videos, based on receiving a first user input from a first user interface.

19. The non-transitory computer-readable medium of claim 18, wherein the first user interface comprises a first spinner for displaying visual representations of the one or more images, photographs, or videos and receiving a selection of the one or more images, photographs, or videos corresponding to the first user input.

20. The non-transitory computer-readable medium of claim 17, wherein the instructions are further configured to cause the one or more processors to perform operations comprising:
  obtaining the audio file from one or more music, song, or other audio data, based on receiving a second user input from a second user interface.

* * * * *